United States Patent
Tanaka et al.

(10) Patent No.: US 8,208,349 B2
(45) Date of Patent: Jun. 26, 2012

(54) THERMALLY-ASSISTED MAGNETIC RECORDING HEAD HAVING A GAP BETWEEN PROPAGATION EDGE AND MAGNETIC POLE

(75) Inventors: Kosuke Tanaka, Tokyo (JP); Daisuke Miyauchi, Tokyo (JP); Susumu Aoki, Tokyo (JP); Tetsuya Roppongi, Tokyo (JP); Tsutomu Chou, Tokyo (JP); Takahiko Izawa, Tokyo (JP); Katsuki Kurihara, Tokyo (JP)

(73) Assignee: TDK Corporation, Tokyo (JP)

( * ) Notice: Subject to any disclaimer, the term of this patent is extended or adjusted under 35 U.S.C. 154(b) by 307 days.

(21) Appl. No.: 12/688,367

(22) Filed: Jan. 15, 2010

(65) Prior Publication Data
US 2011/0176398 A1 Jul. 21, 2011

(51) Int. Cl.
*G11B 11/00* (2006.01)
(52) U.S. Cl. .................. 369/13.33; 369/13.13
(58) Field of Classification Search .......... 369/13.33, 369/13.32, 13.13, 13.02, 112.09, 112.14, 369/112.21, 112.27; 360/59; 385/129, 31, 385/88–94; 29/603.01–603.27; 250/201.3, 250/201.5
See application file for complete search history.

(56) References Cited

U.S. PATENT DOCUMENTS

| | | | |
|---|---|---|---|
| 6,649,894 B2 | 11/2003 | Matsumoto et al. | |
| 6,768,556 B1 | 7/2004 | Matsumoto et al. | |
| 7,330,404 B2 | 2/2008 | Peng et al. | |
| 7,454,095 B2 | 11/2008 | Baehr-Jones et al. | |
| 2006/0139794 A1 | 6/2006 | Aoyagi | |
| 2008/0204916 A1 | 8/2008 | Matsumoto et al. | |
| 2010/0103553 A1* | 4/2010 | Shimazawa et al. | 360/59 |
| 2010/0149930 A1* | 6/2010 | Komura et al. | 369/13.33 |
| 2010/0238580 A1* | 9/2010 | Shimazawa et al. | 360/59 |
| 2010/0290323 A1* | 11/2010 | Isogai et al. | 369/13.24 |
| 2010/0329085 A1* | 12/2010 | Kawamori et al. | 369/13.24 |
| 2011/0002199 A1* | 1/2011 | Takayama et al. | 369/13.24 |
| 2011/0058272 A1* | 3/2011 | Miyauchi et al. | 360/59 |
| 2011/0110202 A1* | 5/2011 | Komura et al. | 369/13.56 |

(Continued)

FOREIGN PATENT DOCUMENTS

JP 2004-273021 9/2004

OTHER PUBLICATIONS

Michael Hochberg, et al., "Integrated plasmon and dielectric waveguides" Optices Express, vol. 12, No. 22, Nov. 2004, pp. 5481-5486.

(Continued)

*Primary Examiner* — Tan X Dinh
(74) *Attorney, Agent, or Firm* — Frommer Lawrence & Haug LLP

(57) ABSTRACT

A thermally-assisted magnetic recording head includes a waveguide, a near-field optical device which emits near-field light from a near-field-light-generating end surface that forms a portion of an opposed-to-medium surface, and a magnetic pole generates write field from its end on the opposed-to-medium surface side. The near-field optical device includes a contact-to-waveguide surface, and a propagation edge configured to propagate there on the surface plasmon excited by the light. A gap between a near-field optical device-opposed surface of the magnetic pole and the propagation edge of the near-field optical device is larger at a section far from the end on the opposed-to-medium surface side than that at a section near the opposed-to-medium surface side.

14 Claims, 11 Drawing Sheets

U.S. PATENT DOCUMENTS

| | | | |
|---|---|---|---|
| 2011/0116349 A1* | 5/2011 | Komura et al. | 369/13.33 |
| 2011/0164479 A1* | 7/2011 | Komura et al. | 369/13.33 |
| 2011/0205660 A1* | 8/2011 | Komura et al. | 360/59 |
| 2011/0205661 A1* | 8/2011 | Komura et al. | 360/59 |
| 2011/0222184 A1* | 9/2011 | Komura et al. | 360/59 |

OTHER PUBLICATIONS

E. Kretschmann, et al., "Radiative Decay of Non Radiative Surface Plasmons Excited by Light" Z. Naturforsch, vol. 23a, 1968, pp. 2135-2136.

Andreas Otto, "Excitation of Nonradiative Surface Plasma Waves in Silver by the Method of Frustrated Total Reflection" Zeitschrift fur Physik, vol. 216, 1968, pp. 398-410.

U.S. Appl. No. 12/616,924 entitled "Thermally-Assisted Magnetic Recording Head Comprising Near-Field Optical Device with Propagation Edge", Applicants: Eiji Komura, et al. filed on Nov. 12, 2009.

U.S. Appl. No. 12/617,853 entitled "Thermally-Assisted Magnetic Recording Head Comprising Near-Field Optical Device with Propagation Edge", Applicants: Eiji Komura, et al. filed on Nov. 13, 2009.

* cited by examiner

_US 8,208,349 B2_

THERMALLY-ASSISTED MAGNETIC RECORDING HEAD HAVING A GAP BETWEEN PROPAGATION EDGE AND MAGNETIC POLE

BACKGROUND OF THE INVENTION

1. Field of the Invention

The present invention relates to a thermally-assisted magnetic recording head used for thermally-assisted magnetic recording in which a magnetic recording medium is irradiated with near-field light beam, thereby anisotropic magnetic field of the medium is lowered, thus data can be written. Further, the present invention relates to a head gimbal assembly (HGA) provided with a suspension for supporting the thermally-assisted magnetic recording head, and to a magnetic recording apparatus provided with the HGA.

2. Description of the Related Art

As the recording density of a magnetic recording apparatus, as represented by a magnetic disk apparatus, becomes higher, further improvement has been required in the performance of a thin-film magnetic head and a magnetic recording medium. Particularly, in the magnetic recording medium, it is necessary to decrease the size of magnetic micro particles that constitute the magnetic recording layer of the medium, and to reduce irregularity in the boundary of record bit in order to improve the recording density. However, the decrease in size of the magnetic micro particles raises a problem of degradation in thermal stability of the magnetization due to the decrease in volume. As a measure against the thermal stability problem, it may be possible to increase the magnetic anisotropy energy Ku of the magnetic micro particles. However, the increase in energy Ku causes the increase in anisotropic magnetic field (coercive force) of the magnetic recording medium. As a result, the head cannot write data to the magnetic recording medium when the anisotropic magnetic field of the medium exceeds the upper write field limit.

Recently, as a method for solving the problem of thermal stability, so-called a thermally-assisted magnetic recording technique was proposed. In the technique, a magnetic recording medium formed of a magnetic material with a large magnetic anisotropy energy Ku is used so as to stabilize the magnetization, then anisotropic magnetic field of a portion of the medium, where data is to be written, is reduced by heating the portion, just after that, writing is performed by applying write magnetic field to the heated portion.

In the thermally-assisted magnetic recording, a technique is well known, which utilizes a near-field optical device as a metal piece that generates near-field light from plasmon excited by irradiated laser light. For example, U.S. Pat. No. 6,768,556 and U.S. Pat. No. 6,649,894 disclose a technique in which near-field light is generated by irradiating a metal scatterer with light and by matching the frequency of the light with the resonant frequency of plasmon excited in the metal.

As described above, various kinds of thermally-assisted magnetic recording systems with near-field optical devices have been proposed. Meanwhile, the present inventors have devised a near-field optical device in which laser light is coupled with the near-field optical device in a surface plasmon mode to cause excited surface plasmon to propagate to the opposed-to-medium surface, thereby providing near-field light, instead of directly applying laser light to a near-field optical device. The near-field optical device is hereinafter referred to as a surface plasmon generator. In the surface plasmon generator, its temperature does not excessively rise because laser light is not directly applied to the surface plasmon generator. As a result, there can be avoided a situation in which the end of a read head element, which reaches the opposed-to-medium surface, becomes relatively far apart from the magnetic recording medium due to the thermal expansion of the near-field optical device, which makes it difficult to properly read servo signals. In addition, there can also be avoided a situation in which the light use efficiency of a near-field light generating optical system including a near-field optical device is degraded because thermal fluctuation of free electrons increases in the near-field light generator.

Here, the near-field light generating optical system is an optical system that includes a waveguide and a near-field optical device, and the light use efficiency of the near-field light generating optical system is given by $I_{OUT}/I_{IN}(\times 100)$, where $I_{IN}$ is the intensity of laser light incident to the waveguide, and $I_{OUT}$ is the intensity of near-field light emitted from a near-field light generating end of the near-field optical device after converting the laser light into surface plasmon in the near-field optical device.

When performing thermal-assisted magnetic recording in practice by using the above-described near-field light generating optical system including the surface plasmon generator, if the end surface of the surface plasmon generator departs from the end surface of the magnetic pole in the opposed-to-medium surface, the write ability will be extremely decreased because a long distance between the heat source and the magnetizing source. Contrary to this, if the end surface of the surface plasmon generator closes to the end surface of the magnetic pole, it is difficult to efficiently heat the magnetic medium because the generated plasmon will strongly affected by the magnetic pole.

SUMMARY OF THE INVENTION

It is therefore an object of the present invention to provide a thermally-assisted magnetic recording head having a sufficient heating ability and providing a sufficient write magnetic field, an HGA provided with the thermally-assisted magnetic recording head, and a magnetic recording apparatus provided with the thermally-assisted magnetic recording head.

Some terms used in the specification will be defined before explaining the present invention. In a layered structure or an element structure formed on an element-formed surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z direction corresponds to a trailing side and –Z direction to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (–X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core.

According to the present invention, a thermally-assisted magnetic recording head includes a waveguide through which a light for exciting surface plasmon propagates, a near-field optical device configured to be coupled with the light in a surface plasmon mode and to emit near-field light from a near-field-light-generating end surface that forms a portion of an opposed-to-medium surface, and a magnetic pole for generating write field from its end on the opposed-to-medium surface side. The near-field optical device includes a contact-to-waveguide surface having a contact to the waveguide, and a propagation edge provided on a side opposite to the contact-to-waveguide surface, extending to the near-field-light-generating end surface, and configured to propagate there on the surface plasmon excited by the light. A gap between a near-field optical device-opposed surface of the magnetic pole and the propagation edge of the near-field optical device is larger at a section far from the end on the opposed-to-medium surface side than that at a section near the on the opposed-to-medium surface side. In other words, the magnetic pole is formed as a whole in a hook shape. That is, a convex protrusion projected toward the near-field optical device is formed at a section near the end surface of the magnetic pole so as to reduce the gap between the near-field optical device-opposed surface of the magnetic pole and the propagation edge of the near-field optical device. Also, at a section far from the end surface, the near-field optical device-opposed surface of the magnetic pole backs away from the near-filed optical device so as to increase the gap between the near-field optical device-opposed surface of the magnetic pole and the propagation edge of the near-field optical device.

Since the gap between the near-field optical device-opposed surface of the magnetic pole and the propagation edge of the near-field optical device is larger at a section far from the end on the opposed-to-medium surface side than that at a section near the on the opposed-to-medium surface side, it is possible to obtain both the sufficient heating ability and sufficient write magnetic field, which are necessary for the recording to the magnetic medium.

It is preferred that the gap $D_G$ between the near-field optical device-opposed surface of the magnetic pole and the propagation edge of the near-field optical device is constant when a distance from the end on the opposed-to-medium surface side of the magnetic pole is equal to or less than a predetermined value $D_H$, and that the gap $D_G$ increases when the distance is larger than the predetermined value $D_H$. In this case, more preferably, the predetermined value $D_H$, namely a length of a section along which the magnetic pole protrudes toward the near-field optical device (pole length), is equal to or less than 500 nm. Further preferably, the predetermined value $D_H$ is larger less than 50 nm.

It is also preferred that the gap $D_G$ between the near-field optical device-opposed surface of the magnetic pole and the propagation edge of the near-field optical device is equal to or larger than 15 nm. In this case, more preferably, the gap $D_G$ between the near-field optical device-opposed surface of the magnetic pole and the propagation edge of the near-field optical device is equal to or smaller than 80 nm.

It is further preferred that the near-field optical device has substantially a shape of triangle pole, that the contact-to-waveguide surface is one of side surfaces of the triangle pole, and that the propagation edge is a side edge that is opposed to the one of side surfaces.

It is still further preferred that the near-field optical device is formed of an alloy that contains at least one element selected from a group of gold (Au), silver (Ag), aluminum (Al), palladium (Pd), copper (Cu), ruthenium (Ru), rhodium (Rh) and iridium (Ir).

It is further preferred that the near-field optical device is covered with a material that has a refractive index lower than a refractive index of a constituent material of the waveguide, a portion of the material that covers the near-field optical device lying between the magnetic pole and the propagation edge. Preferably, the material is a constituent material of an overcoat layer formed so as to cover the waveguide, the near-field optical device and the magnetic pole. Also, more preferably, a magnetic shield is provided on a side opposite to the magnetic pole when viewed from the near-field optical device.

It is preferred that the waveguide, the near-field optical device and a portion of a material that covers the near-field optical device are arranged in a Kretschmann configuration. The Kretschmann configuration is a configuration of optical system for exciting surface plasmon with use of evanescent light based on different principal as that of an Otto configuration. The Kretschmann configuration has an arrangement of a first dielectric region, a metal region and a second dielectric region with a refractive index lower than that of the first dielectric region, which are sequentially disposed from the side of the incidence of laser light, any neighboring regions having a contact with each other. Namely, the first dielectric region and the metal region are directly in contact with each other to generate an evanescent light at the boundary thereof. Whereas the Otto configuration is a configuration in which a first dielectric region, a second dielectric region that has a refractive index lower than that of the first dielectric region, and a metal region are sequentially disposed from the side of the incidence of laser light, any neighboring regions having a contact with each other. The principles of exciting surface plasmon by utilizing the respective configurations are different from each other. As a result, these configurations realize optical formations different from each other, and provide dispersion relations of surface plasmon different from each other. The Kretschmann configuration is explained in detail, for example, in E. Kretschmann and H. Raether, "Radiative Decay of Non Radiative Surface Plasmons Excited by Light", Z. Naturforsch. Vol. 23a, pp 2135-2136 (1968). And the Otto configuration is explained in detail, for example, in Otto, "Excitation of Nonradiative Surface Plasma Waves in Silver by the Method of Frustrated Total Reflection", Zeitschrift fur Physik Vol. 216, pp 398-410 (1968).

According to the present invention, also, an HGA includes the aforementioned thermally-assisted magnetic recording head and a suspension supporting the thermally-assisted magnetic recording head.

According to the present invention, furthermore, a magnetic recording apparatus includes at least one HGA provided with the aforementioned thermally-assisted magnetic recording head and a suspension supporting the thermally-assisted magnetic recording head, at least one magnetic recording medium, and a recording circuit configured to control write operations that the thermally-assisted magnetic recording head performs to the at least one magnetic recording medium. The recording circuit further includes a light-emission control circuit configured to control operations of a light source that generates the light for exciting surface plasmon.

Further objects and advantages of the present invention will be apparent from the following description of the preferred embodiments of the invention as illustrated in the accompanying drawings.

BRIEF DESCRIPTION OF THE DRAWINGS

FIG. 1b is a perspective view schematically illustrating a structure of an HGA of the magnetic recording apparatus shown in FIG. 1a;

FIG. 2 is a perspective view schematically illustrating a structure of a thermally-assisted magnetic recording head of the magnetic recording apparatus shown in FIG. 1a;

DESCRIPTION OF THE PREFERRED EMBODIMENTS

Figure 1A:
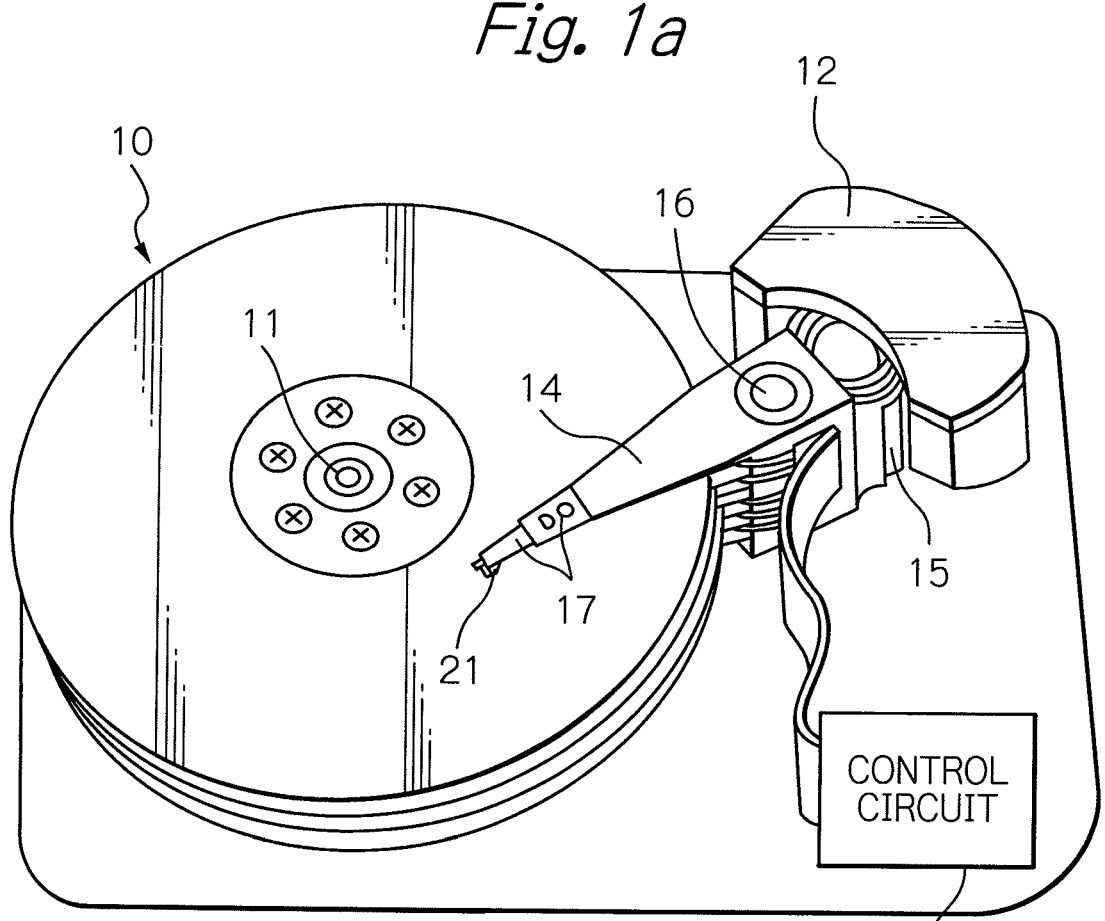
FIG. 1a shows a perspective view schematically illustrating a structure of an embodiment of a magnetic recording apparatus according to the present invention.

Hereinafter, an embodiment according to the present invention will be described with reference to these appended drawings. In these drawings, the similar elements are indicated by using the same reference symbols, respectively. Also, in the drawings, dimensions in each element and between the elements are optional for easy understanding of the configuration.

Figure 1B:
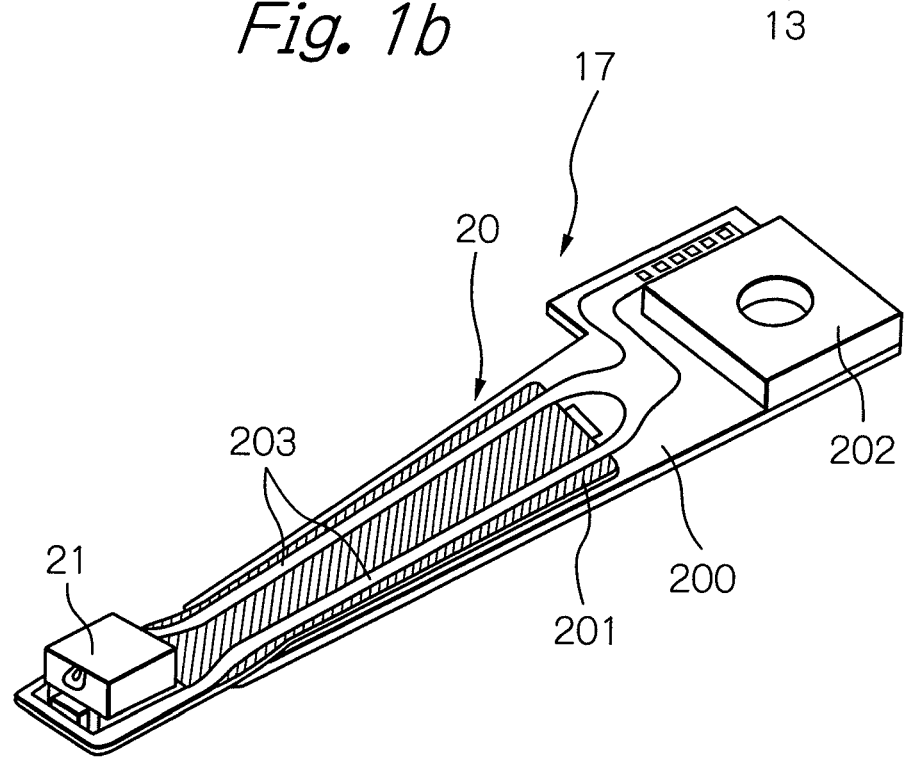

FIG. 1a schematically illustrates a structure of an embodiment of a magnetic recording apparatus according to the present invention, and FIG. 1b schematically illustrates a structure of an HGA of the magnetic recording apparatus shown in FIG. 1a. In FIG. 1b, the side of the HGA, which is opposed to the surface of the magnetic recording medium, is presented as the upper side.

A magnetic disk apparatus as a magnetic recording apparatus shown in FIG. 1a includes a plurality of magnetic disks 10 as magnetic recording media, rotating around a rotational axis of a spindle motor 11, an assembly carriage device 12 provided with a plurality of drive arms 14 therein, an HGA 17 attached on the top end section of each drive arm 14 and provided with a thermally-assisted magnetic recording head 21 as a thin-film magnetic head, and a recording/reproducing and light-emission control circuit 13 for controlling write/read operations of the thermally-assisted magnetic recording head 21 and further for controlling the emission operation of a laser diode as a light source that generates laser light used for thermally-assisted magnetic recording, which will be described later.

In this embodiment, the magnetic disk 10 is designed for perpendicular magnetic recording, and has a structure in which sequentially stacked on a disk substrate is a soft-magnetic under layer, an intermediate layer and a magnetic recording layer (perpendicular magnetization layer). The assembly carriage device 12 is a device for positioning the thermally-assisted magnetic recording head 21 above a track on which recording bits are aligned, the track being formed on the magnetic recording layer of the magnetic disk 10. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, a single magnetic disk 10, a single drive arm 14, a single HGA 17 and a single thermally-assisted magnetic recording head 21 may be provided.

Referring also to FIG. 1b, a suspension 20 in the HGA 17 includes a load beam 200, a flexure 201 with elasticity fixed to the load beam 200, and a base plate 202 provided on the base section of the load beam 200. Further, on the flexure 201, there is provided a wiring member 203 that is made up of lead conductors and connection pads electrically joined to both ends of the lead conductors. The thermally-assisted magnetic recording head 21 is fixed on the flexure 201 at the top end section of the suspension 20 so as to face the surface of the magnetic disk 10 with a predetermined spacing (flying height). Moreover, one ends of the wiring member 203 are electrically connected to terminal electrodes of the thermally-assisted magnetic recording head 21. The structure of the suspension 20 is not limited to the above-described one. An IC chip for driving the head may be mounted midway on the suspension 20, though not shown.

Figure 2:
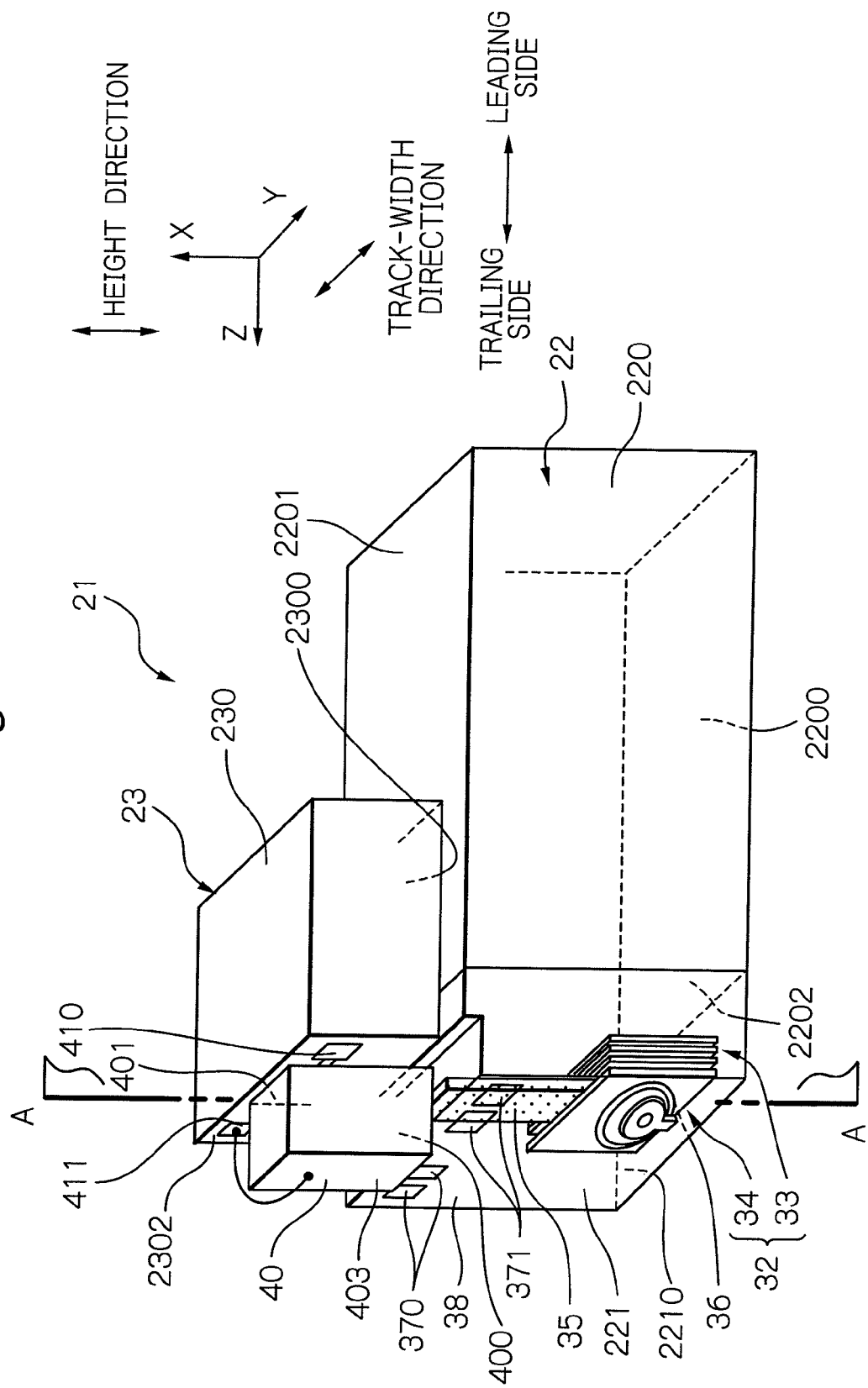

FIG. 2 schematically illustrates a structure of the thermally-assisted magnetic recording head 21 of the magnetic recording apparatus shown in FIG. 1a.

As shown in FIG. 2, the thermally-assisted magnetic recording head 21 is constituted of a slider 22 and a light source unit 23. The slider 22 includes a slider substrate 220 formed of, for example, AlTiC ($Al_2O_3$—TiC), and having an air bearing surface (ABS) 2200 processed so as to provide an appropriate flying height, and a head part 221 formed on an element-formed surface 2202 perpendicular to the ABS 2200. While, the light source unit 23 includes a unit substrate 230 formed of, for example, AlTiC ($Al_2O_3$—TiC), and having an joining surface 2300, and a laser diode 40 as a light source provided on a source-installation surface 2302 perpendicular to the joining surface 2300. The slider 22 and the light source unit 23 are bonded to each other in such a way that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220. Alternatively, the thermally-assisted magnetic recording head 21 may have a configuration in which the laser diode 40 is provided directly on the slider 22 without using the light source unit 23.

In the slider 22, the head part 221 formed on the element-formed surface 2202 of the slider substrate 220 includes a head element 32 constituted of a magnetoresistive (MR) element 33 for reading data from the magnetic disk and an electromagnetic transducer 34 for writing data to the magnetic disk, a waveguide 35 for guiding laser light generated from a laser diode 40 provided in the light source unit 23 to the opposed-to-medium surface side, a surface plasmon generator 36, the generator 36 and the waveguide 35 constituting a near-field-light-generating optical system, an overcoat layer 38 formed on the element-formed surface 2202 in such a way as to cover the MR element 33, the electromagnetic transducer 34, the waveguide 35, and the surface plasmon generator 36, a pair of terminal electrodes 370 exposed in the upper surface of the overcoat layer 38 and electrically connected to the MR element 33, and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1b).

One ends of the MR element 33, the electromagnetic transducer 34 and the surface plasmon generator 36 reach a head part end surface 2210, which is an opposed-to-medium surface of the head part 221. Here, the head part end surface 2210 and the ABS 2200 constitute the whole opposed-to-medium surface of the thermally-assisted magnetic recording head 21.

During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk with an appropriate magnetic spacing. Then, the MR element 33 reads data by sensing signal magnetic field from the magnetic recording layer, and the electromagnetic transducer 34 writes data by applying signal magnetic field to the magnetic recording layer.

When writing data, laser light generated from the laser diode 40 of the light source unit 23 propagates through the waveguide 35. Then, the propagating laser light is coupled with the surface plasmon generator 36 in a surface plasmon mode, and causes surface plasmon to be excited on the surface plasmon generator 36. The surface plasmon propagates on a propagation edge, which will be explained later, of the surface plasmon generator 36 toward the head part end surface 2210, the propagation edge being on the side opposite to the waveguide 35 in the surface plasmon generator 36. Thereby, near-field light is generated from the end of the surface plasmon generator 36 on the head part end surface 2210 side. The generated near-field light reaches the surface of the magnetic disk, and heats a section of the magnetic recording layer of the magnetic disk. As a result, the anisotropic magnetic field (coercive force) of the portion is decreased to a value that enables writing, thus the thermally-assisted magnetic recording can be accomplished by applying write field to the portion with decreased anisotropic magnetic field.

Figure 3:
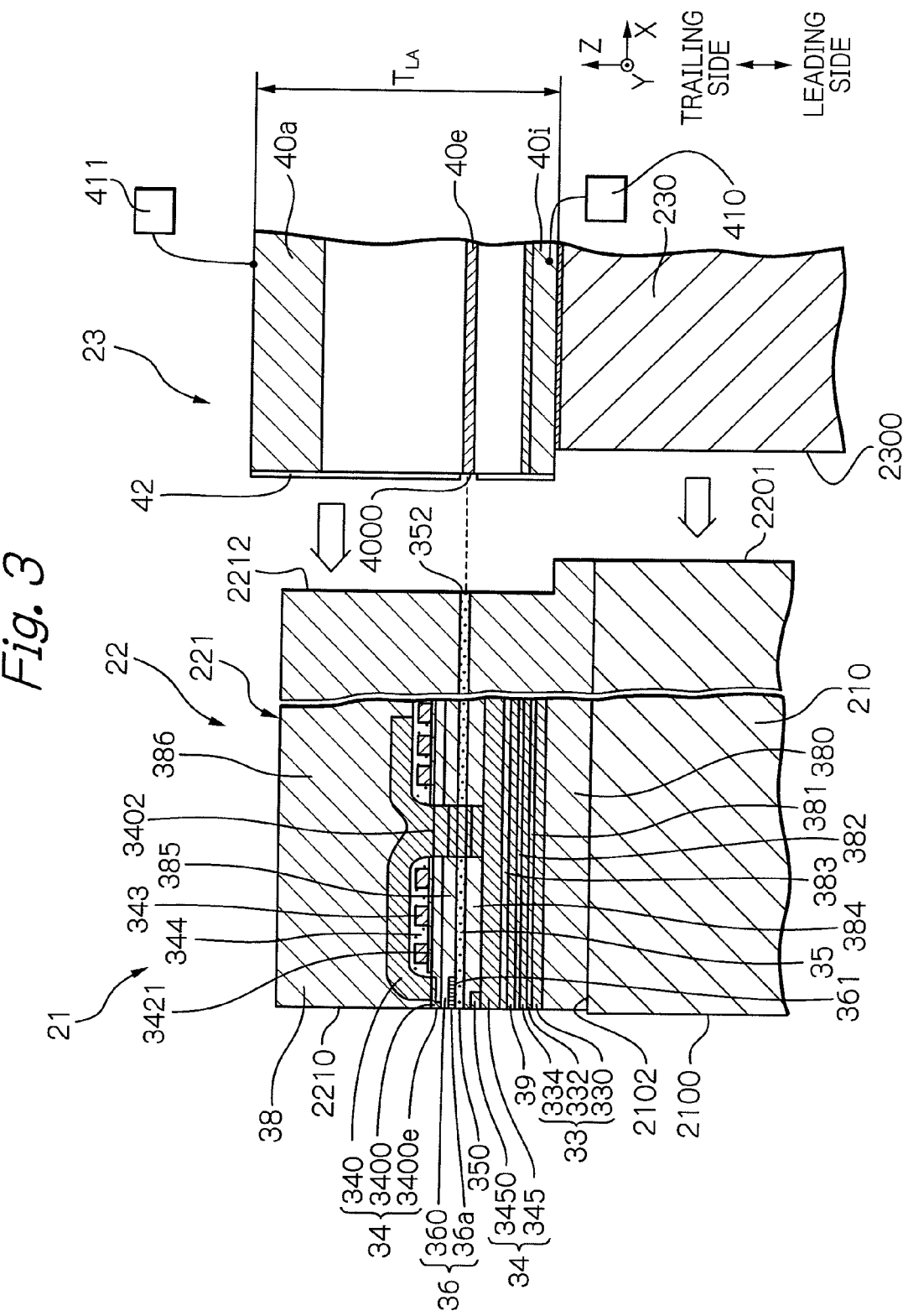
FIG. 3 is a cross-sectional view taken by plane A in FIG. 2, schematically illustrating a structure of a main part of the thermally-assisted magnetic recording head shown in FIG. 2.

FIG. 3 schematically illustrates the structure of a main part of the thermally-assisted magnetic recording head 21, as a cross-section taken by plane A in FIG. 2.

As shown in FIG. 3, the MR element 33 is formed on an insulation layer 380 stacked on the element-formed surface 2202, and includes an MR multi-layered structure 332, and a lower shield layer 330 and an upper shield layer 334 which sandwich the MR multi-layered structure 332 and an insulation layer 381 there between. The upper and lower shield layers 334 and 330 prevent the MR multi-layered structure 332 from receiving external magnetic field as a noise. The MR multi-layered structure 332 is a magneto-sensitive part for detecting signal magnetic field by using MR effect. The MR multi-layered structure 332 may be, for example, a current-in-plane giant magnetoresistive (CIP-GMR) multi-layered structure that utilizes CIP-GMR effect, a current-perpendicular-to-plane giant magnetoresistive (CPP-GMR) multi-layered structure that utilizes CPP-GMR effect, or a tunnel magnetoresistive (TMR) multi-layered structure that utilizes TMR effect. The MR multi-layered structure 332 that utilizes any MR effect described above can detect signal magnetic field from the magnetic disk with high sensitivity. In the case that the MR multi-layered structure 332 is a CPP-GMR multi-layered structure or a TMR multi-layered structure, the upper and lower shield layers 334 and 330 act as electrodes.

Referring also to FIG. 3, the electromagnetic transducer 34 is designed for perpendicular magnetic recording, and includes an upper yoke layer 340, a main pole 3400, a write coil layer 343, a coil-insulation layer 344, a lower yoke layer 345 and a lower shield 3450.

The upper yoke layer 340 is formed so as to cover the coil-insulation layer 344, and the main pole 3400 is formed on an insulation layer 385 made of an insulating material such as $Al_2O_3$ (alumina). These upper yoke layer 340 and main pole 3400 are magnetically connected with each other, and acts as a magnetic path for converging and guiding magnetic flux toward the magnetic recording layer (perpendicular magnetization layer) of the magnetic disk, the magnetic flux being excited by write current flowing through the write coil layer 343. The main pole 3400 reaches the head part end surface 2210, and the end surface 3400e of the main pole 3400, which is a portion of the end surface 2210, has an edge LSE (FIGS. 4 and 5) closest to the lower shield 3450 (most on the leading side), the edge being at a position where write field is generated. The edge LSE has a very small width $W_P$ (FIG. 5) in the track width direction (Y-axis direction), which enables a fine write field responding to higher recording density to be generated. The width $W_P$ is, for example, in the range about from 0.05 to 0.5 μm. The main pole 3400 is formed of a soft-magnetic material with a saturation magnetic flux density higher than that of the upper yoke layer 340, which is, for example, an iron alloy containing iron (Fe) as a main component, such as nickel iron (FeNi), cobalt iron (FeCo), nickel cobalt iron (FeCoNi), iron nitride (FeN) or zirconium iron nitride (FeZrN). The thickness of the main pole 3400 is, for example, in the range about from 0.1 to 0.8 μm.

The write coil layer 343 is formed on an insulation layer 3421 made of an insulating material such as $Al_2O_3$, in such a way as to pass through in one turn at least between the lower yoke layer 345 and the upper yoke layer 340, and has a spiral structure turned around a back contact portion 3402 as a center. The write coil layer 343 is formed of a conductive material such as Cu (copper). The write coil layer 343 is covered with a coil-insulation layer 344 that is formed of an insulating material such as a heat-cured photoresist and electrically isolates the write coil layer 343 from the upper yoke layer 340. The write coil layer 343 has a monolayer structure in the present embodiment. However, in modifications, the write coil layer 343 may have a two or more layered structure, or may have a helical coil shape in which the upper yoke layer 340 is sandwiched there between. Further, the number of turns of the write coil layer 343 is not limited to that shown in FIG. 3, and may be, for example, in the range from two to seven.

The back contact portion 3402 has a though-hole extending in X-axis direction, and the waveguide 35 and insulation layers that cover the waveguide 35 pass through the though-hole. In the though-hole, the waveguide 35 is away at a predetermined distance of, for example, at least 1 μm from the inner wall of the back contact portion 3402. The distance prevents the absorption of the waveguide light by the back contact portion 3402.

The lower yoke layer 345 is formed on an insulation layer 383 made of an insulating material such as $Al_2O_3$, and acts as a magnetic path for the magnetic flux returning from a soft-magnetic under layer that is provided under the magnetic recording layer (perpendicular magnetization layer) of the magnetic disk 10. The lower yoke layer 345 is formed of a soft-magnetic material, and its thickness is, for example, approximately 0.5 to 5 µm. Further, the lower shield 3450 is a magnetic shield that reaches the head part end surface 2210, being magnetically connected with the lower yoke layer 345.

The lower shield 3450 is provided on the opposite side to the main pole 3400 from the surface plasmon generator 36, and acts for receiving the magnetic flux spreading from the main pole 3400. The lower shield 3450 has a width in the track width direction greatly larger than that of the main pole 3400. This lower shield 3450 causes the magnetic field gradient between the end portion of the lower shield 3450 and the main pole 3400 to become steeper. As a result, jitter of signal output becomes smaller, and therefore, error rates during read operations can be reduced. The lower shield 3450 is preferably formed of a material with high saturation magnetic flux density such as NiFe (permalloy) or an iron alloy as well as the main pole 3400.

Referring also to FIG. 3, the waveguide 35 and the surface plasmon generator 36 are provided between the lower yoke layer 345 (lower shield 3450) and an upper yoke layer 340 (main pole 3400), and form an optical system for generating near-filed light in the head part 221. The waveguide 35 is provided in parallel with an element-formed surface 2202 and extends from the rear end surface 352 which is a portion of the head part rear end surface 2212 to the end surface 350 which is a portion of the head part end surface 2210. Alternatively, the end surface 350 may be recessed in +X direction from the head part end surface 2210, not reaching the end surface 2210. The surface plasmon generator 36 is located between the waveguide 35 and the main pole 3400, and includes a contact-to-waveguide surface 361 that is contacted to the waveguide 35, and a propagation edge 360 that is located on the side opposite to the contact-to-waveguide surface 361 (on the trailing side; +Z side) of the surface plasmon generator 36. That is, the waveguide 35 and the surface plasmon generator 36 are surface-contacted with each other. The propagation edge 360 extends to a near-filed light generating end surface 36a that generates near-filed light, and propagates surface plasmon to the near-filed light generating end surface 36a, the surface plasmon being excited by laser light (waveguide light) that has propagated through the waveguide 35.

Further, the surface plasmon generator 36 is covered with an insulation layer 385 formed of a material that has a refractive index lower than that of the constituent material of the waveguide 35. The waveguide light that has propagated through the waveguide 35 can be coupled with the surface plasmon generator 36 in a surface plasmon mode by using the insulation layer 385 as a buffering portion. Here, the waveguide 35, the surface plasmon generator 36 and a portion of the insulation layer 385 are arranged in a Kretschmann configuration. Namely, the waveguide 35 that is a dielectric region and the surface plasmon generator 36 that is a metal region are directly in contact with each other, and the surface plasmon generator 36 and the insulation layer 385 that is a dielectric region with a refractive index lower than that of the waveguide 35 are in contact with each other so that an evanescent light is generated at the boundary between the waveguide 35 and the surface plasmon generator 36. The formation of the present invention utilizing the Kretschmann configuration enables the intensity of near-field light to be drastically reduced at the position of the edge contacted with the waveguide 35 on the near-field light generating end surface 36a. That is, there can be more intensively generated near-field light at the vertex on the main pole 3400 side, which is the intended position.

Further, the insulation layer 385 as well as the insulation layer 384 covers a portion of the waveguide 35 as a core near the head part end surface 221, and acts for a clad. In this embodiment, the insulation layer 385, which is a portion of the overcoat layer 38, is also used as a buffering portion. Alternatively, a new independent layer may be provided as the buffering portion instead of the insulation layer 385. A detailed explanation of the waveguide 35, the surface plasmon generator 36 and the main pole 3400 will be given later with reference to FIG. 4. Further, as is in this embodiment, an inter-element shield layer 39 is desirably provided between the MR element 33 and the electromagnetic transducer 34, sandwiched by the insulation layers 382 and 383. The inter-element shield layer 39 may be formed of a soft-magnetic material, and plays a role for shielding the MR element 33 from magnetic field generated from the electromagnetic transducer 34.

The light source unit 23 includes a unit substrate 230, a laser diode 40 provided on the source-installation surface 2302 of the unit substrate 230, a terminal electrode 410 electrically connected to the lower surface 401 as an electrode of the laser diode 40, and a terminal electrode 411 electrically connected to the upper surface 403 as an electrode of the laser diode 40. The terminal electrodes 410 and 411 are electrically connected to the connection pads of the wiring member 203 provided on the flexure 201 (FIG. 1b). By applying a predetermined voltage between both electrodes 410 and 411 of the laser diode 40, laser light is emitted from the emission center on an emission surface 400 of the laser diode 40. Here, in the configuration of the head as shown in FIG. 3, the oscillation of electric field component of the laser light generated from the laser diode 40 is desirably in a direction perpendicular to the stacking surface of the active layer 40e (Z-axis direction). That is, it is desired that the laser diode 40 generates a laser light of TM mode polarization. This enables the laser light propagating through the waveguide 35 to be coupled with the surface plasmon generator 36 in a surface plasmon mode.

A laser diode such as InP family, GaAs family or GaN family diode can be utilized as the laser diode 40, which is usually used for communication, optical disk storage or material analysis. The wavelength $\lambda_L$ of the radiated laser light may be, for example, in the range of approximately 375 nm to 1.7 µm. Specifically, for example, a laser diode of InGaAsP/InP quaternary mixed crystal can also be used, in which possible wavelength region is set to be from 1.2 to 1.67 µm. The laser diode 40 has a multi-layered structure including an upper-electrode 40a, an active layer 40e and a lower-electrode 40i. On the front and rear cleaved surfaces of the multi-layered structure of the laser diode 40, respectively formed are reflection layers for exciting the oscillation by total reflection. The reflection layer 42 has an opening in the position of the active layer 40e including the light-emission center 4000. Here, the laser diode 40 has a thickness $T_{LA}$ in the range of, for example, approximately 60 to 200 µm.

An electric source provided within the magnetic disk apparatus is used for driving the laser diode 40. In fact, the magnetic disk apparatus usually has an electrical source for supplying a voltage in the range, for example, approximately from 2 to 5V, which is sufficient for the laser oscillation. The amount of electric power consumption of the laser diode 40 is, for example, in the order of several tens mW, which can be covered sufficiently by the electrical source provided within the magnetic disk apparatus. Configurations and arrangement of the laser diode 40 and terminal electrodes 410 and 411 are not limited to these in the above-described embodiment. For example, the electrodes of the laser diode 40 can be turned upside down, thus the n-electrode 40a may be bonded to the source-installation surface 2302 of the unit substrate 230. Further, alternatively, a laser diode may be provided on the element-formed surface 2202 of the thermally-assisted magnetic recording head 21, and then can be optically connected with the waveguide 35. Furthermore, the thermally-assisted magnetic recording head 21 may include no laser diode 40, then, the light-emission center of a laser diode provided within the magnetic disk apparatus and the rear-end surface 352 of the waveguide 35 may be connected by using, for example, an optical fiber.

Each of the slider 22 and light source unit 23 may have an arbitrary size. For example, the slider 22 may be so-called a "femto slider" in which the width in the track width direction (Y-axis direction) is 700 µm, the length (in Z-axis direction) is 850 µm, and the thickness (in X-axis direction) is 230 µm. In the case, the light source unit 23 may be one size smaller than the slider 22, and may have a size, for example, in which the width in the track width direction is 425 µm, the length is 300 µm, and the thickness is 300 µm.

By joining the above-described light source unit 23 and slider 22, there is constituted the thermally-assisted magnetic recording head 21. In the joining, the joining surface 2300 of the unit substrate 230 will be in surface contact with the back surface 2201 of the slider substrate 220. Then, the locations of the unit substrate 230 and the slider substrate 220 are determined in such a way that the laser light generated from the laser diode 40 can directly enter the waveguide 35 through the rear-end surface 352 opposite to the ABS 2200 of the waveguide 35.

Figure 4:
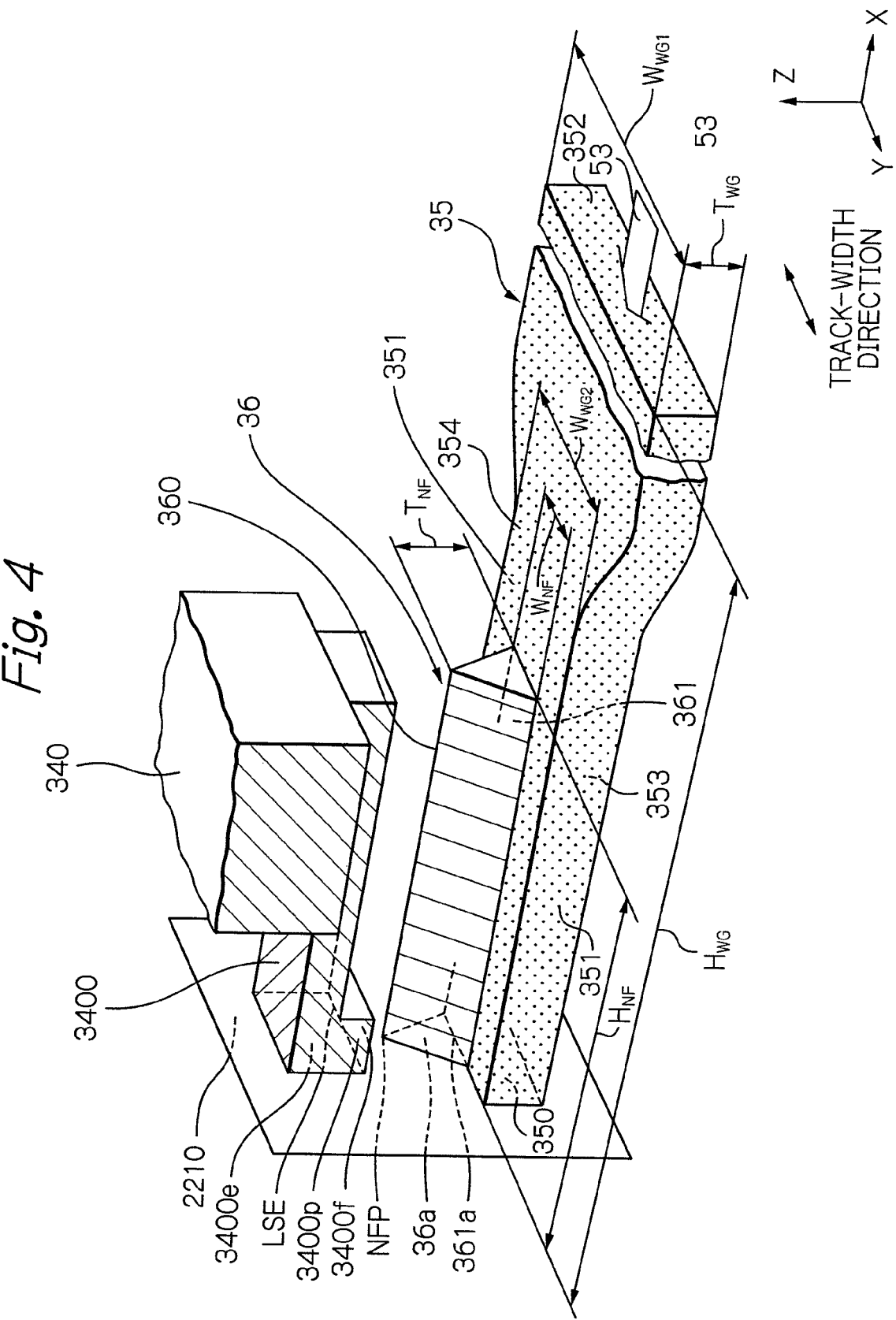
FIG. 4 is a perspective view schematically illustrating configurations of a waveguide, a surface plasmon generator and a main pole of the thermally-assisted magnetic recording head shown in FIG. 2.

FIG. 4 schematically illustrates the configuration of the waveguide 35, the surface plasmon generator 36 and the main pole 3400.

In the figure, the head part end surface 2210 is positioned at the left side, the end surface 2210 including positions where write field and near-filed light are emitted toward the magnetic recording medium.

Referring to FIG. 4, there are provided a waveguide 35 that propagates laser light 53 for generating near-filed light and a surface plasmon generator 36 that propagates surface plasmon excited by the laser light (waveguide light) 53 propagating through the waveguide 35 and generates near-filed light. In this embodiment, the surface plasmon generator 36 includes a contact-to-waveguide surface 361 that is contacted to the waveguide 35, a propagation edge 360 that is located on the side opposite to the contact-to-waveguide surface 361 (on the trailing side, +Z side) of the surface plasmon generator 36, and a near-filed light generating end surface 36a that reaches the head part end surface 2210, from which near-filed light is generated. That is, the waveguide 35 and the surface plasmon generator 36 are in surface contact with each other. The propagation edge 360 extends to the near-filed light generating end surface 36a, and acts for propagating surface plasmon to the near-filed light generating end surface 36a, the surface plasmon being excited by the waveguide light 53. In this embodiment, the surface plasmon generator 36 has substantially a shape of triangle pole extending in X-axis direction. The contact-to-waveguide surface 361 is one of side surfaces (plain surfaces) of the triangle pole, and the propagation edge 360 is a side edge that is opposed to the one side surface. Here, the above term "substantially" means that the triangle pole as a shape of the surface plasmon generator 36 includes a generator shape in which, for example, at least one side surface becomes somewhat curved or at least one side edge is rounded with a predetermined curvature, depending on the method for forming the surface plasmon generator 36.

Further, the surface plasmon generator 36, except the contact-to-waveguide surface 361, is covered with the insulation layer 385 (FIG. 3) that has a refractive index lower than that of the constituent material of the waveguide 35. That is, the insulation layer 385 covers the propagation edge 360 that is located on the side opposite to the waveguide 35, the insulation layer 385 lies also between the waveguide 35 and the main pole 3400. The waveguide light propagated through the waveguide 35 can be coupled with the surface plasmon generator 36, especially with the propagation edge 360, in a surface plasmon mode by using the insulation layer 385 as a buffering portion.

Here, the waveguide 35, the surface plasmon generator 36 and a portion of the insulation layer 385 are arranged in a Kretschmann configuration. As mentioned before, the Kretschmann configuration is a configuration of optical system for exciting surface plasmon with use of evanescent light, and has an arrangement of a first dielectric region, a metal region and a second dielectric region with a refractive index lower than that of the first dielectric region, which are sequentially disposed from the side of the incidence of laser light, any neighboring regions having a contact with each other. Namely, the waveguide 35 that is a dielectric region and the surface plasmon generator 36 that is a metal region are directly in contact with each other, and the surface plasmon generator 36 and the insulation layer 385 that is a dielectric region with a refractive index lower than that of the waveguide 35 are in contact with each other so that an evanescent light is generated at the boundary between the waveguide 35 and the surface plasmon generator 36.

As described above, a portion of the upper surface (side surface) of the waveguide 35 and the contact-to-waveguide surface 361 of the surface plasmon generator 36 are in surface contact with each other, and the waveguide 35, the surface plasmon generator 36 and a portion of the insulation layer 385 are arranged in the Kretschmann configuration. In this configuration, there is no buffering portion between the waveguide 35 and the surface plasmon generator 36, and thus, as a matter of course, there is no need to adjust a buffering portion there between. As a result, the variation in strength of the coupling in the surface plasmon mode is suppressed, thus a stable near-field light can be generated. That is to say, in case that there exists a buffering portion between the waveguide 35 and the surface plasmon generator 36, the variation in thickness of the buffering portion would be required to be suppressed so that strengths of the couplings in the surface plasmon mode do not vary among heads. On the contrary, as in this embodiment, if the waveguide 35 and the surface plasmon generator 36 are in surface contact with each other, there is no buffering portion there between, thus there is a release from the problem of variations in thickness of buffering portions. Also, the formation of this embodiment utilizing the Kretschmann configuration enables the intensity of near-field light to be drastically reduced at the position of the edge 361a on the waveguide 35 side on the near-field light generating end surface 36a, as will be explained later. That is, there can be more intensively generated near-field light at the vertex NFP on the main pole 3400 side, which is the intended position.

As shown in FIG. 4, the waveguide 35 is formed on the −z side (leading side) of the surface plasmon generator 36, that is, on the side opposite to the main pole 3400 when viewed from the waveguide 35. In this configuration, the waveguide 35 can be located at a distance from the main pole 3400 even though the end surface 3400e of the main pole 3400 for generating write field is adjacent to the near-field light generating end surface 36a that generates near-field light. This can prevent reduction in the amount of the waveguide light 53 to be converted into near-field light due to partial absorption of the waveguide light 53 into the main pole 3400 made of a metal.

Particularly, in this embodiment, the main pole 3400 is formed as a whole in a hook shape. That is, a convex protrusion 3400p projected toward the surface plasmon generator 36 is formed at a section near the end surface 3400e of the main pole 3400 so as to reduce a gap size $D_G$ (FIG. 8) between a surface plasmon generator-opposed surface 3400f of the main pole 3400 and the propagation edge 360 of the surface plasmon generator 36. Also, at a section far from (in a plus direction of X-axis) the end surface 3400e, the surface plasmon generator-opposed surface 3400f of the main pole 3400 backs away from the surface plasmon generator 36 so as to increase the gap $D_G$ between this surface plasmon generator-opposed surface 3400f and the propagation edge 360 of the surface plasmon generator 36. In this embodiment, thanks for the triangle pole shape of the surface plasmon generator 36, for the Kretschmann configuration where the waveguide 35 is in contact with the surface plasmon generator 36, and for the hook shape of the main pole 3400 as a whole, it is possible to obtain both the sufficient heating ability and sufficient write magnetic field, which are necessary for the perpendicular recording to the magnetic disk 10.

It is desired that a length along X-axis or pole height $D_H$ of the convex protrusion 3400p is as will be mentioned later 50 nm$<D_H \leq$500 nm, and the gap size $D_G$ between the surface plasmon generator-opposed surface 3400f and the propagation edge 360 of the surface plasmon generator 36 at the convex protrusion 3400p is as will be mentioned later 15 nm$\leq D_G \leq$80 nm.

The waveguide 35 may have a shape with a constant width in the track width direction (Y-axis direction), or as shown in FIG. 4, may have a portion on the head part end surface 2210 side, which has a narrower width in the track width direction (Y-axis direction). The width $W_{WG1}$ in the track width direction (Y-axis direction) of a portion of the waveguide 35 on the rear end surface 352 side may be, for example, in the range approximately from 0.5 to 200 μm, the rear end surface 352 being opposite to the head part end surface 2210 in the waveguide 35. The width $W_{WG2}$ in the track width direction (Y-axis direction) of a portion of the waveguide 35 on the end surface 350 side may be, for example, in the range approximately from 0.3 to 100 μm. Also, the thickness $T_{WG}$ (in Z-axis direction) of a portion on the rear end surface 352 side may be, for example, in the range approximately from 0.1 to 4 μm, and the height or length $H_{WG}$ (in X-axis direction) may be, for example, in the range approximately from 10 to 300 μm.

Further, the side surfaces of the waveguide 35, namely the upper surface 354, the lower surface 353 and both the side surfaces 351, in the track width direction (Y-axis direction) have a surface contact with the overcoat layer 38 (FIG. 2), that is, the insulation layers 384 and 385 (FIG. 3), except a portion contacted with the contact-to-waveguide surface 361 of the surface plasmon generator 36. Here, the waveguide 35 is formed of a material with a refractive index $n_{WG}$ higher than a refractive index $n_{OC}$ of the constituent material of the overcoat layer 38 (insulation layers 384 and 385), made by using, for example, a sputtering method. Therefore, the surface plasmon generator 36, except the contact-to-waveguide surface 361, is covered with the insulation layer 385 (FIG. 3) that has a refractive index $n_{OC}$ lower than a refractive index $n_{WG}$ of the constituent material of the waveguide 35. For example, in the case that the wavelength $\lambda_L$ of laser light is 600 nm and the overcoat layer 38 is formed of silicon dioxide ($SiO_2$: n=1.5), the waveguide 35 can be formed of, for example, alumina ($Al_2O_3$: n=1.63). Further, in the case that the overcoat layer 38 is formed of $Al_2O_3$ (n=1.63), the waveguide 35 can be formed of, for example, silicon oxide nitride ($SiO_xN_y$: n=1.7-1.85), tantalum pentaoxide ($Ta_2O_5$: n=2.16), niobium pentaoxide ($Nb_2O_5$: n=2.33), titanium oxide (TiO: n=2.3-2.55) or titanium dioxide ($TiO_2$: n=2.3-2.55). This material structure of the waveguide 35 enables the propagation loss of laser light 53 to be reduced due to the excellent optical characteristics of the constituent material. Further, the existence of the waveguide 35 as a core and the overcoat layer 38 as a clad can provide total reflection conditions in all the side surfaces. As a result, more amount of laser light 53 can reach the position that is opposed to the contact-to-waveguide surface 361 of the surface plasmon generator 36, which improves the propagation efficiency of the waveguide 35. Meanwhile, the waveguide 35 is desirably a single-mode waveguide in order to stabilize the wavenumber K of the waveguide light propagating through the waveguide 35 and to reliably excite surface plasmon. Here, the single-mode waveguide is a waveguide in which the laser light propagating within the waveguide has a beam cross-section with a shape of circle or ellipsoid, and the light intensity distribution in the cross-section is single-peaked, especially a Gaussian. Laser light propagating through the single-mode waveguide can become a stable laser light with an intended intensity even in the case that, for example, the light beam is squeezed.

The surface plasmon generator 36 is desirably made of silver (Ag) or an alloy mainly containing Ag. The alloy may contain at least one element selected from the group consisting of gold (Au), aluminum (Al), palladium (Pd), copper (Cu), ruthenium (Ru), rhodium (Rh) and iridium (Ir). By forming the surface plasmon generator 36 from such alloy, the near-filed light emission efficiency second to that formed from Ag (Ag being a material having theoretically the highest near-filed light emission efficiency) can be achieved and, in addition, defects such as cracking and chipping of the propagation edge 360 can be sufficiently minimized.

The surface plasmon generator 36 desirably has a thickness $T_{NF}$ (in Z-axis direction), which is a distance between the propagation edge 360 and the contact-to-waveguide surface 361, in the range of 70 to 140 nm as explained later, which is sufficiently smaller than the wavelength of laser light 53. The surface plasmon generator 36 also desirably has a width $W_{NF}$ in the track width direction (Y-axis direction) in the contact-to-waveguide surface 361, the width $W_{NF}$ being sufficiently smaller than the wavelength of laser light 53. Further, the length $H_{NF}$ (in X-axis direction) of the surface plasmon generator 36 can be set to be, for example, in the range of approximately 0.3 to 6.0 μm. The length $H_{NF}$ is, in this embodiment, a length of a buffering portion sandwiched between the side surface 354 of the waveguide 35 and the contact-to-waveguide surface 361, and is desirably larger than the wavelength $\lambda_L$ of laser light 53. In this desirable case, the buffering portion has an area markedly larger than a so-called "focal region" in the case that, for example, laser light is converged on a buffering portion and a near-filed light optical device and is coupled in a surface plasmon mode. As a result, very stable coupling in the surface plasmon mode can be achieved.

Figure 5:
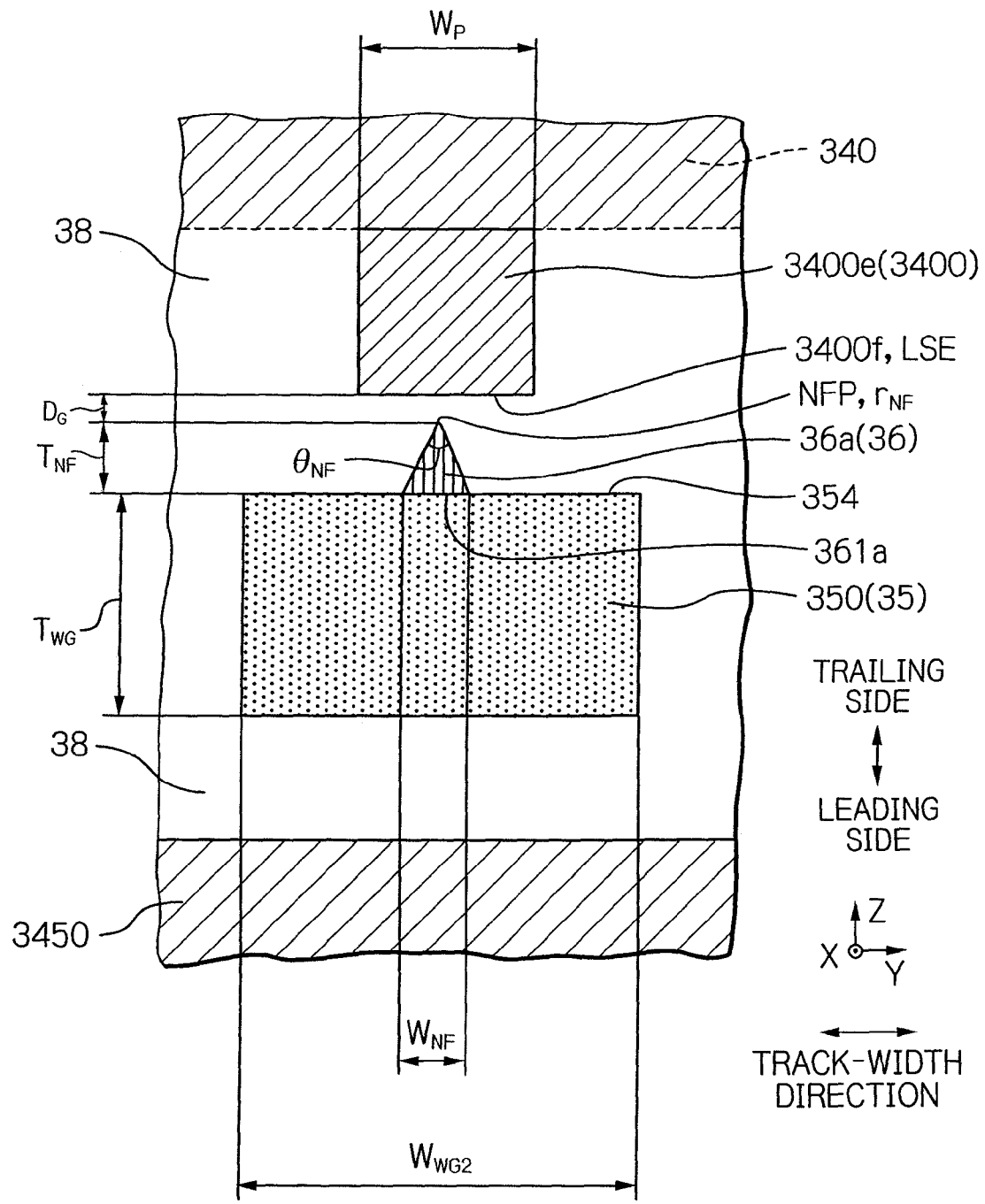
FIG. 5 is a plain view illustrating shapes of end surfaces of the waveguide, the surface plasmon generator and an electromagnetic transducer on a head part end surface.

FIG. 5 illustrates the shapes of the end surfaces of the waveguide 35, the surface plasmon generator 36 and the electromagnetic transducer 34 on the head part end surface 2210 (FIG. 4).

As shown in the figure, in the electromagnetic transducer 34, the main pole 3400 and the lower shield 3450 reach the head part end surface 2210. The end surface 3400e of the main pole 3400 on the head part end surface 2210 has a shape of, for example, rectangle, square or trapezoid. The above-described width $W_P$ is equivalent to a length in the track width direction (Y-axis direction) of the edge LSE in the end surface 3400e, the edge LSE being closest to the lower shield 3450 (most on the leading side). Thus, the width $W_P$ determines the width of a track formed on a magnetic recording layer of a magnetic disk in the case of magnetic dominant recording. The width $W_P$ can be in the range, for example, approximately from 0.05 to 0.5 μm.

On the head part end surface 2210, the near-field light generating end surface 36a of the surface plasmon antenna 36 is positioned close to the end surface 3400e of the main pole 3400 and in the leading side (−Z direction side) of the end surface 3400e. Further, in this embodiment, the near-field light generating end surface 36a has a shape of isosceles triangle in which a bottom edge 361a is on the waveguide 35 side (leading side: +Z direction side) and a vertex NFP on the main pole 3400 side is an end of the propagation edge 360. The distance between the vertex NFP and the bottom edge 361a, that is, the thickness $T_{NF}$ (in Z-axis direction) of the surface plasmon generator 36 is preferably in the range from 70 to 140 nm.

The vertex NFP as a point where near-field light is generated is located on the main pole 3400 side because the propagation edge 360 is provided on the side opposite to the waveguide 35, as described above. As a result, the vertex NFP can be disposed much close to the edge LSE where write field is generated. A distance between the vertex NFP and the edge LSE on the head part end surface 2210, that is, a gap size $D_G$ between the surface plasmon generator-opposed surface 3400f and the propagation edge 360 of the surface plasmon generator 36 at the convex protrusion 3400p of the main pole 3400 is desirably as mentioned before 15 nm≦$D_G$≦80 nm. In the thermally-assisted magnetic recording according to the present invention, the vertex NFP functions as a main heating action part, and the edge LSE functions as a writing action part. Therefore, by setting the gap size $D_G$ in the above-described way, write field with sufficiently large gradient can be applied to a portion of the magnetic recording layer of the magnetic disk, the portion having been sufficiently heated. This enables a stable thermally-assisted write operation to be securely achieved.

The distance between the waveguide 35 and the main pole 3400 becomes as $D_G+T_{NF}$. Thus, even if the gap size $D_G$ is set to a very small value of 15 nm≦$D_G$≦80 nm as mentioned before, the distance between the waveguide 35 and the main pole 3400 can be maintained at a value corresponding to the thickness $T_{NF}$ at least so as to sufficiently separate the waveguide 35 from the main pole 3400 and the upper yoke layer 340. As a result, it is possible to prevent that laser light propagated through the waveguide 35 is partially absorbed by the main pole 3400 or the upper yoke layer 340, made of a metal material to decrease the amount of light to be converted into near-field light.

Further, the vertex angle $θ_{NF}$ of the vertex NFP of the near-file light generating end surface 36a, that is in this embodiment, a vertex angle of the vertex corresponding to the propagation edge 360 in the cross-section of the surface plasmon generator 36, the cross-section being taken by the plane perpendicular to the propagation edge 360 (YZ-plane) is desirably in a range from 10 to 50 degrees. Furthermore, the propagation edge 360 is rounded to prevent the reduction in light use efficiency due to the running off of the surface plasmon from the propagation edge 360. The vertex radius (curvature radius) $r_{NF}$ of the rounded propagation edge is desirably set in a range from 7.5 to 18 nm. The appropriate setting of the vertex angle $θ_{NF}$ and vertex radius $r_{NF}$ enables near-file light with a sufficiently high intensity to be generated at the vertex NFP.

The above-described distance $D_G$ between the vertex NFP and the edge LSE, that is, the gap size $D_G$ between the propagation edge 360 and the main pole 3400 in this embodiment, is desirably set to be a value of the vertex radius $r_{NF}$ or more, and to be 100 nm or less. The surface plasmon propagating on the propagation edge 360 toward the vertex NFP is found to be spread in the range of approximately the same distance as the vertex radius $r_{NF}$ from the propagation edge 360. Therefore, it is understood that the main pole 3400 is desirably at a distance from the propagation edge 360 by setting the distance $D_G$ to be a value of the vertex radius $r_{NF}$ or more in order to avoid the increase in propagation loss of surface plasmon due to the absorption of the surface plasmon into the main pole 3400.

Figure 6:
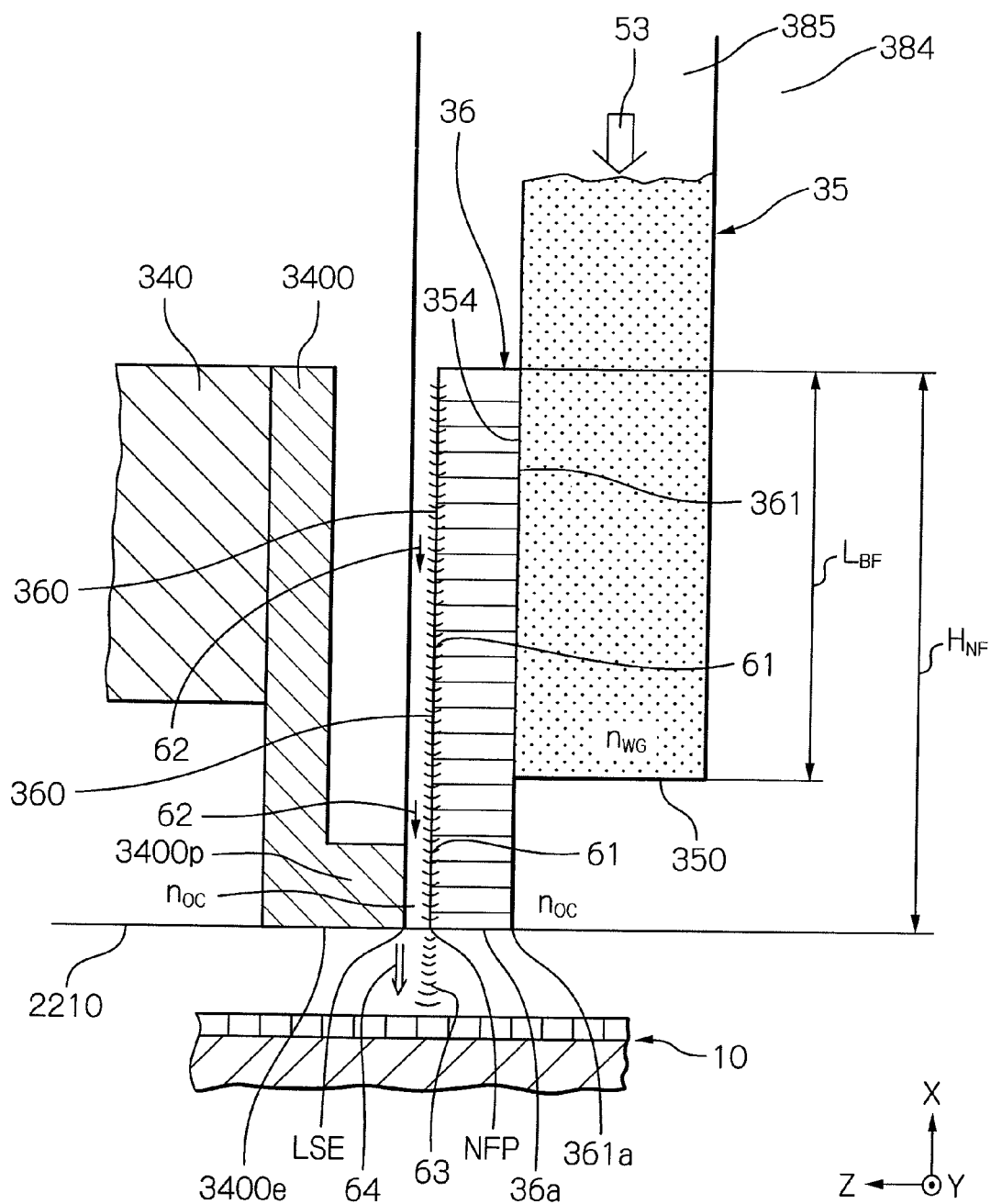
FIG. 6 is a schematic view for explaining thermally-assisted magnetic recording utilizing a surface plasmon mode according to the present invention.
Figure 7:
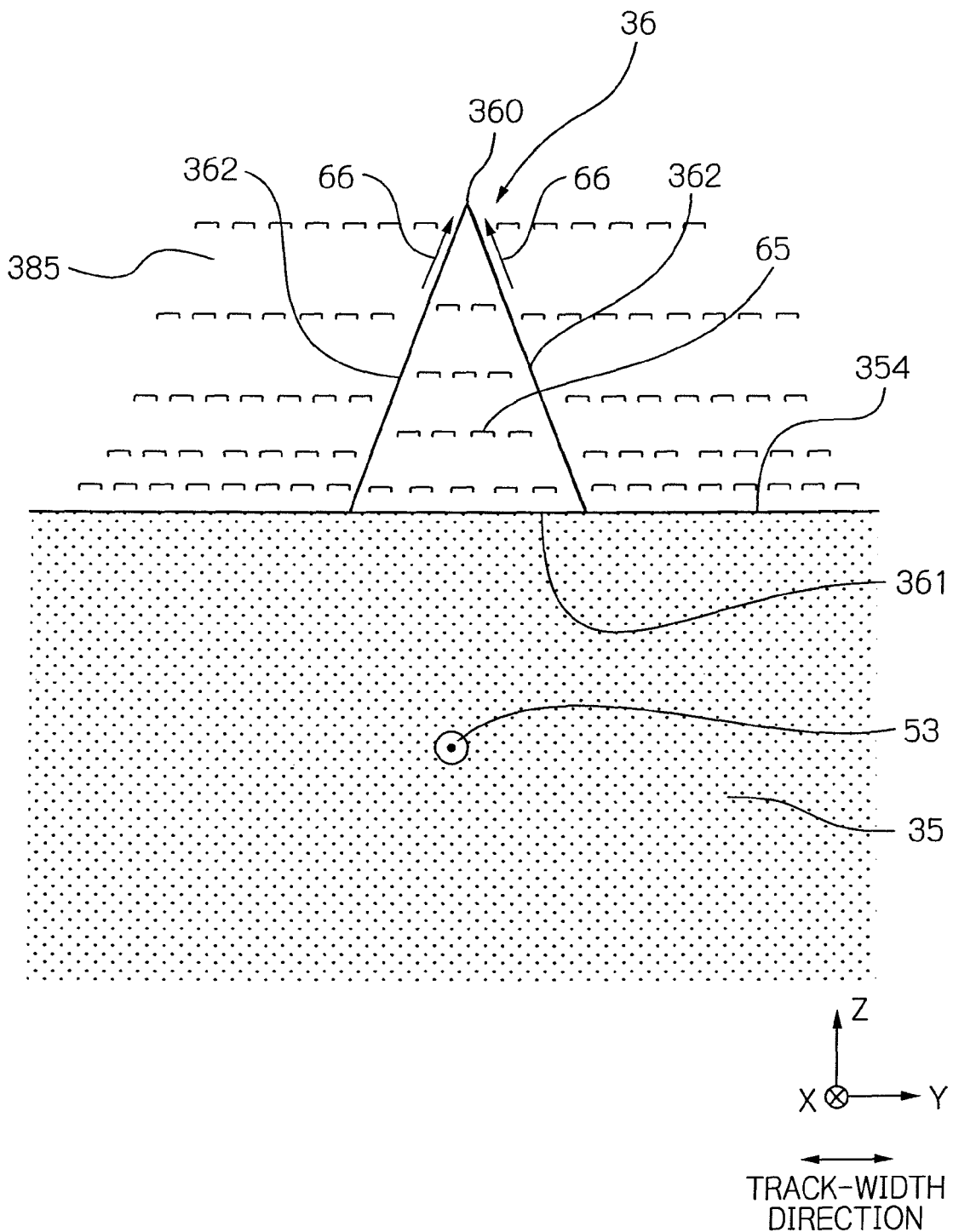
FIG. 7 is a schematic view for explaining thermally-assisted magnetic recording utilizing the surface plasmon mode according to the present invention.

FIGS. 6 and 7 explain the thermally-assisted magnetic recording utilizing a surface plasmon mode according to the present invention. FIG. 6 indicates a cross-section taken by ZX-plane, and FIG. 7 indicates a cross-section taken by YZ-plane. Also, in FIG. 6, the end surface 350 of the waveguide 35 is recessed in +X direction from the head part end surface 2210, not reaching the end surface 2210, as a modification of the embodiment shown in FIG. 4. However, the principle of thermally-assisted magnetic recording explained below apples to the respective embodiments shown in FIGS. 4 and 6.

Referring to FIG. 6, when the electromagnetic transducer 34 writes data onto the magnetic recording layer of the magnetic disk 10, first, laser light 53 emitted from the laser diode 40 of the light source unit 23 propagates through the waveguide 35. Next, the laser light (waveguide light) 53, which has advanced to near the contact-to-waveguide surface 361 of the surface plasmon generator 36, is coupled with the optical configuration including the waveguide 35 with a refractive index $n_{WG}$, the buffering portion (insulation layer 385) with a refractive index $n_{OC}$, and the surface plasmon generator 36 made of a conductive material such as a metal, and induces a surface plasmon mode in the propagation edge 360 of the surface plasmon generator 36. That is, the waveguide light couples with the surface plasmon generator 36 in a surface plasmon mode. This surface plasmon mode can be induced by setting the refractive index $n_{OC}$ of the buffering portion (insulation layer 385) to be smaller than the refractive index $n_{WG}$ of the waveguide 35 ($n_{OC}<n_{WG}$), the buffering portion covering a portion of the generator 36 including the propagation edge 360 except the contact-to-waveguide surface 361.

The structure of sequentially stacking the waveguide 35 made of a dielectric material having a refractive index $n_{WG}$, the surface plasmon generator 36 made of a conductive material such as a metal, and a portion of the insulation layer 385 made of a dielectric material having a refractive index $n_{OC}$ ($n_{OC}<n_{WG}$) constitutes Kretschmann configuration, and based on this configuration, surface plasmon is excited. Actually, as shown in FIG. 7, evanescent light 65 is excited within the surface plasmon generator 36 and within the insulation layer 385, based on the above-described optical boundary condition between the waveguide 35 and the generator 36, the evanescent light 65 being a part of waveguide light 53 seeping out from the boundary (side surface 354) of the waveguide 35. The evanescent light 65 propagates within the insulation layer 385 in such a way as to leave the side surface 354, and further propagates within the surface plasmon generator 36 toward the propagation edge 360 though being attenuated. The evanescent light 65 that propagates within the generator 36 and converges on the edge 360 is coupled with the fluctuation of electric charge excited on the boundary of the generator 36 with respect to the insulation layer 385, which induces a surface plasmon mode, and thus surface plasmon is excited.

To be exact, there excited is surface plasmon polariton in this system because surface plasmon as elementary excitation is coupled with an electromagnetic wave. However, the surface plasmon polariton will be hereinafter referred to as surface plasmon for short.

As shown also in FIG. 7, the surface plasmon excited on positions distant from the propagation edge 360 also induces a surface plasmon mode, as shown by arrows 66, in the propagation edge 360 that is an edge having the smallest acute-angle, as the surface plasmon proceeds in the direction toward the near-field light generating end surface 36a (in −X direction). As a result, by appropriately setting the size and shape of the surface plasmon generator 36 as described above, most of the excited surface plasmon can be propagated on the propagation edge 360. Here, the length $L_{BF}$ of the surface plasmon generator 36 (contact-to-waveguide surface 361) contacted with the upper surface (side surface) 354 of the waveguide 35 is also one of important parameters for inducing the surface plasmon mode. Further, in the configuration of this embodiment that utilizes the Kretschmann configuration, matching the frequency of waveguide light with the resonant frequency of surface plasmon is optically designed, taking into account the fact that the induction of the surface plasmon mode influences on the wavenumber K of laser light (waveguide light) that propagates through the waveguide 35.

Backing to FIG. 6, the excited surface plasmon 61 propagates along on the edge 360 in the direction shown by arrow 62. The destination of propagation edge 360 is the vertex NFP of the near-field light generating end surface 36a, then the surface plasmon 61 propagating on the edge 360, namely, electric field converges at the vertex NFP. As a result, near-field light 63 is emitted from the vertex NFP. The near-field light 63 is radiated toward the magnetic recording layer of the magnetic disk 10, and reaches the surface of the magnetic disk 10 to heat a portion of the magnetic recording layer of the disk 10. This heating reduces the anisotropic magnetic field (coercive force) of the portion to a value with which write operation can be performed. Immediately after the heating, write field 64 generated from the main pole 3400 is applied to the portion to perform write operation. Thus, the thermally-assisted magnetic recording can be achieved.

In the configuration utilizing the Kretschmann configuration in which the waveguide 35 and the surface plasmon generator 36 have a surface contact with each other, no buffering portion lies between the upper surface (side surface) 354 of the waveguide 35 and the contact-to-waveguide surface 361. As a result, the amount of surface plasmon that is excited on the contact-to-waveguide surface 361 and propagates on the surface 361 is significantly reduced due to the lack of certain optical boundary condition. Therefore, the intensity of near-field light is drastically reduced at the position of the edge 361a on the near-field light generating end surface 36a, especially at the positions of both ends of the edge 361a. That is, the near-field light 63 can be generated more intensively at the vertex NFP that is on the main pole 3400 side. In this way, by intentionally propagating surface plasmon on the propagation edge 360 and then generating the near-field light 63 with maximum intensity at the vertex NFP, the emitting position of near-field light 63 can be set to be maximally close to the edge LSE where write field 64 is generated. This enables a write field having a sufficiently large gradient to be applied to a sufficiently heated portion in the magnetic recording layer of the magnetic disk 10. Consequently, a thermally-assisted, stable write operation can be reliably performed.

Meanwhile, in a conventional case in which a near-field light optical device provided on the end surface of a head is directly irradiated with a laser light propagating through a waveguide, most of the irradiating laser light has been converted into thermal energy within the NF-optical device. In this case, the size of the NF-optical device has been set smaller than the wavelength of the laser light, and its volume is very small. Therefore, the near-field light optical device has been brought to a very high temperature, for example, 500° C. due to the thermal energy. As a result, there has been a problem that the end of a read head element, which reaches the opposed-to-medium surface, becomes relatively far apart from the magnetic disk due to the thermal expansion of the near-field light optical device, which makes it difficult to properly read servo signals during recording operations. Further, there has been another problem that the light use efficiency is degraded because thermal fluctuation of free electrons increases in the near-field light optical device.

On the contrary, in the thermally-assisted magnetic recording according to this embodiment, a surface plasmon mode is used, near-field light 63 is generated by propagating surface plasmon 61 toward the head part end surface 2210. This brings the temperature at the near-field light generating end surface 36a to, for example, about 100° C. during the emission of near-field light, the temperature being drastically reduced compared to the conventional. Thus, this reduction of temperature allows the protrusion of the near-field light generating end surface 36a toward the magnetic disk 10 to be suppressed; thereby favorable thermally-assisted magnetic recording can be achieved.

Furthermore, in the head 21 according to the present invention, the length $L_{BF}$ (length $H_{NF}$ in the embodiment shown in FIG. 4) of the portion through which the waveguide 35 and the surface plasmon generator 36 are coupled with each other in a surface plasmon mode, is desirably larger than the wavelength $\lambda_L$ of laser light 53. In this case, the coupled portion has an area markedly larger than a so-called "focal region" in the case that, for example, laser light is converged on a buffering portion and a surface plasmon generator and coupled in a surface plasmon mode. Therefore, the configuration quite different from the system including such "focal region" can be realized in the present invention, thus, very stable coupling in the surface plasmon mode can be achieved. The induction of a surface plasmon mode is disclosed in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), U.S. Pat. No. 7,330,404 B2, and U.S. Pat. No. 7,454,095 B2.

Hereinafter, practical examples will be described in which the generation of near-field light in a near-field light generating optical system according to the present invention was analyzed in simulations.

Figure 8:
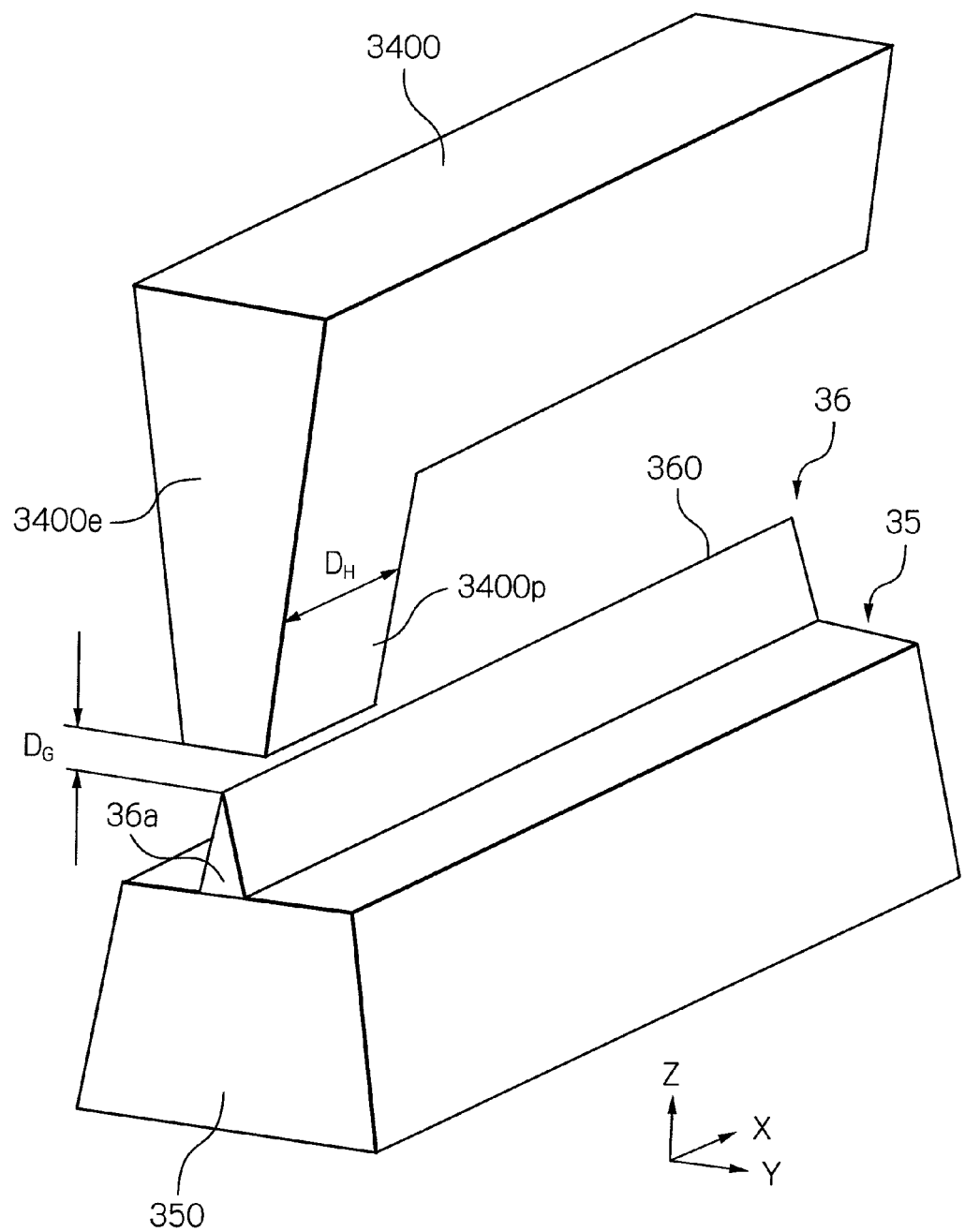
FIG. 8 is a perspective view schematically illustrating a configuration of a model used in the simulation.

FIG. 8 schematically illustrates a configuration of a model used in the simulation.

In this simulation, the intensity distribution of near-filed light generated in the near-field light generating end surface of the surface plasmon generator 36 was examined. More concretely, the intensity distribution of near-field light generated at the near-field light generating end surface of the surface plasmon generator and the intensity of magnetic field at the ABS were calculated in simulation analysis experiments conducted by using three-dimensional Finite-Difference Time-Domain (FDTD) method, which is an electromagnetic field analysis.

In this simulations, laser light entering the waveguide 35 was a TM-polarized Gaussian beam having a wavelength $\lambda_L$ of 825 nm, the TM-polarization having the electric-field oscillation direction of the laser light perpendicular to the upper surface 354, that is, in Z-axis direction. The intensity $I_{IN}$ of the laser light was 1.0 (V/m)². The waveguide 35 was formed of TaO$_x$ (with a refractive index $n_{WG}$=2.15), and the surface plasmon generator 36 was formed of Au. The real part of the refractive index of the Au was 0.223 and the imaginary part was 5.080. The waveguide 35 and the surface plasmon generator 36 were covered with Al$_2$O$_3$ (refractive index $n_{OC}$=1.65) that acts as a buffering portion and a clad.

[Relationship Between the Intensity of the Near-Field Light and the Space Size $D_G$ Between the Surface Plasmon Generator and the Main Pole]

Figure 9B:
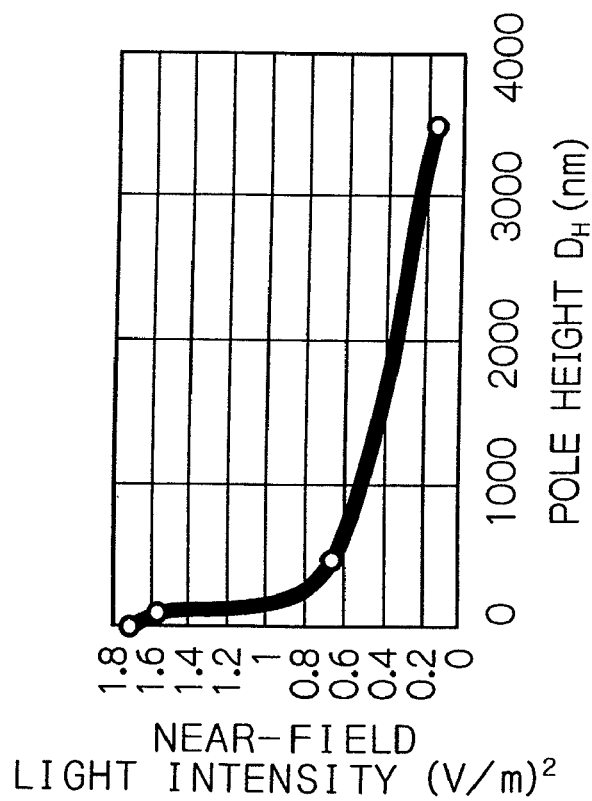
FIG. 9b is a graph illustrating relationship, obtained by the simulation, between a pole height $D_H$ and an intensity of near-field light.
Figure 9A:
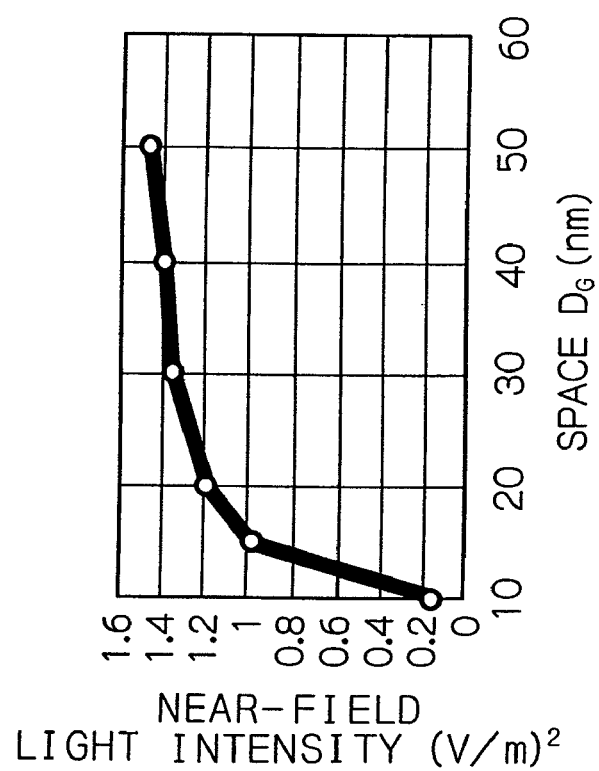
FIG. 9a is a graph illustrating relationship, obtained by the simulation, between a gap $D_G$ between the near-field light generator and the main pole and an intensity of near-field light.

Using the model shown in FIG. 8, a relationship between the intensity of the near-field light and the space size $D_G$ between the propagation edge 360 of the surface plasmon generator 36 and the surface plasmon generator-opposed surface 3400f of the main pole 3400 at the convex protrusion 3400p was simulated. In this simulation, the length along X-axis or pole height $D_H$ of the convex protrusion 3400p was set as $D_H$=100 nm. FIG. 9a indicates the result of the simulation, wherein the lateral axis represents the gap size $D_G$ (nm), and the longitudinal axis represents the intensity of the near-field light ((V/m)²). As will be noted from the figure, since the near-field light intensity steeply lowers when the space is shorter than 15 nm, it is desired that $D_G$ is as 15 nm$\leq D_G$.

[Relationship Between the Intensity of the Magnetic Field at the ABS and the Distance from the Main Pole]

Figure 10:
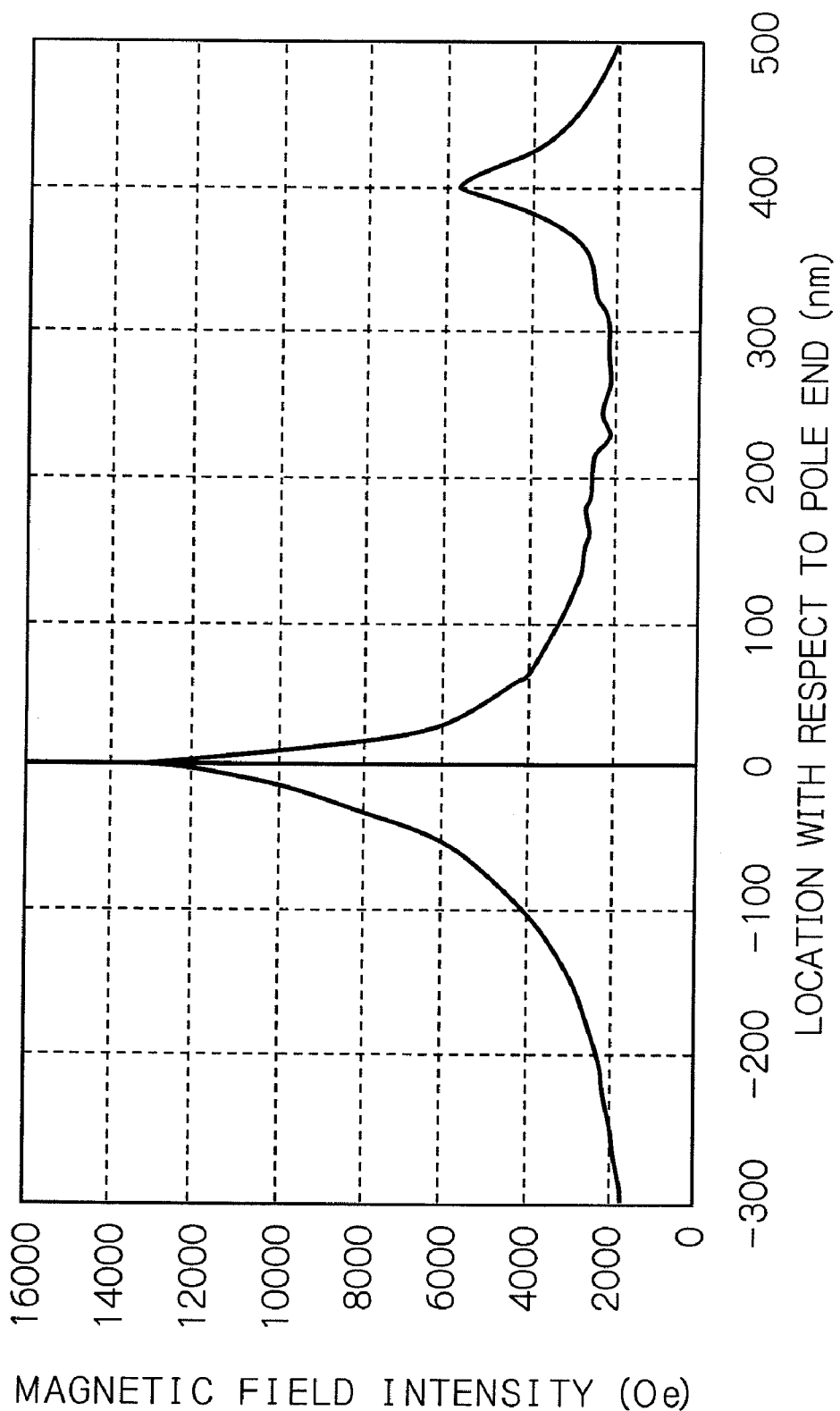
FIG. 10 is a graph illustrating relationship, obtained by the simulation, between a location with respect to the pole end and a magnetic field intensity.

Also, in the thermally-assisted magnetic recording head, the relationship between the intensity of the magnetic field at the ABS and the distance (the distance along −Z-axis direction) from the end surface of the main pole 3400 was simulated. This simulation was performed under the conditions with no magnetic disk. FIG. 10 indicates the result of the simulation, wherein the lateral axis represents the distance from the surface plasmon generator-opposed surface of the main pole 3400 (nm), and the longitudinal axis represents the intensity of the magnetic field (Oe). As will be noted from the figure, it is desired that the distance from the pole end of the magnetic pole is 80 nm or less to obtain the magnetic field intensity of 5000 Oe or more, which is necessary for writing onto the magnetic disk. Therefore, it is desired that the gap size $D_G$ between the propagation edge 360 of the surface plasmon generator 36 and the surface plasmon generator-opposed surface of the main pole 3400 at the convex protrusion 3400p is as $D_G$'$\leq$80 nm.

[Relationship Between the Intensity of the Near-Field Light and the Pole Height $D_H$]

Using the model shown in FIG. 8, a relationship between the intensity of the near-field light and the length along X-axis or pole height $D_H$ of the convex protrusion 3400p $D_H$ was simulated. In this simulation, the gap size $D_G$ was set as $D_G$=20 nm. FIG. 9b indicates the result of the simulation, wherein the lateral axis represents the pole height $D_H$ (nm), and the longitudinal axis represents the intensity of the near-field light ((V/m)²). As will be noted from the figure, since the near-field light intensity saturates at a lower level condition when the pole height $D_H$ exceeds 500 nm, it is desired that $D_H$ is as $D_H \leq$500 nm.

[Relationships Between the Intensity of the Magnetic Field at the ABS and the Pole Height $D_H$]

Figure 11:
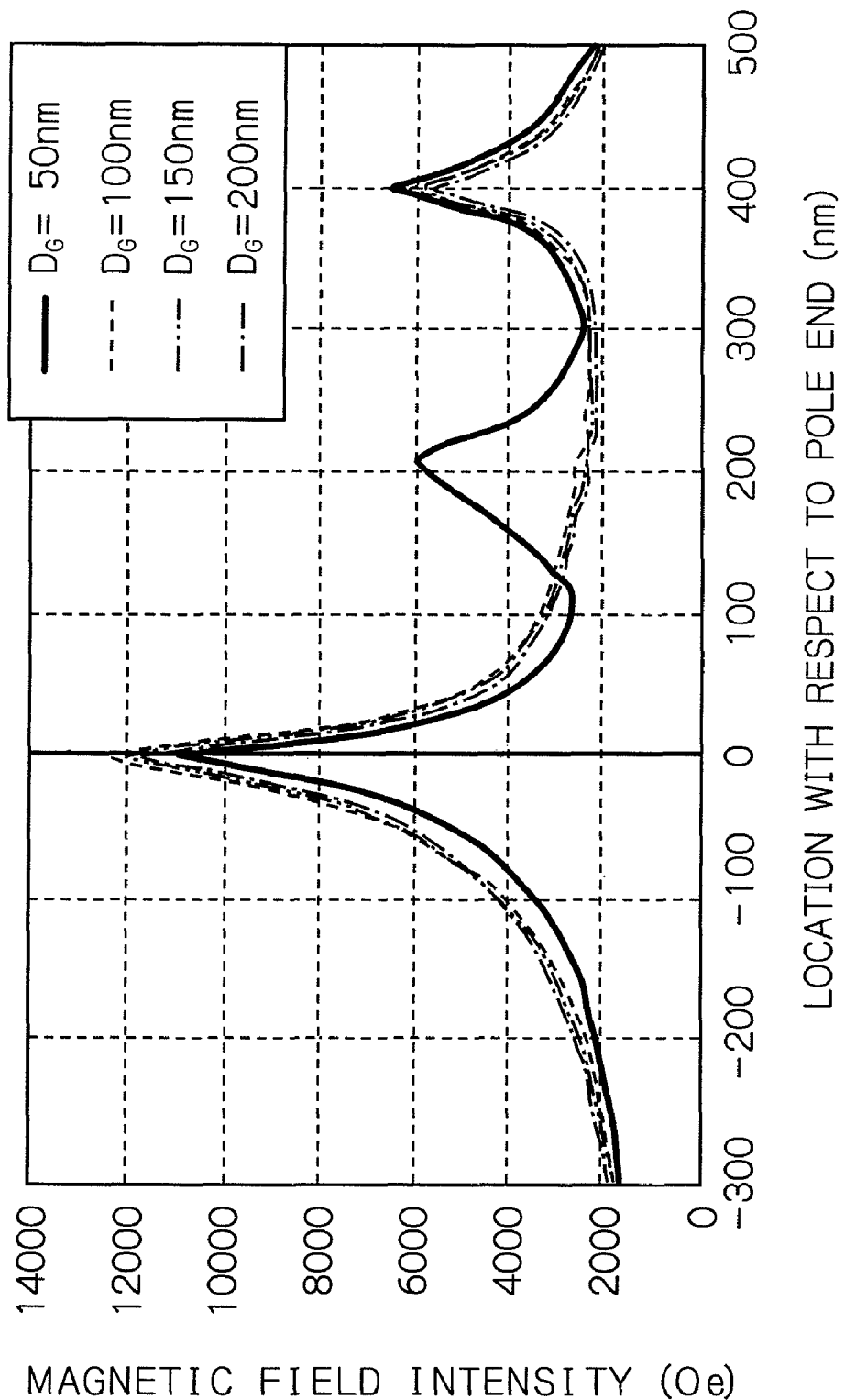
FIG. 11 is a graph illustrating relationship, obtained by the simulation, between a location with respect to the pole end and magnetic field intensity, indicated using as a parameter the pole height $D_H$ of the main pole.

Further, in the thermally-assisted magnetic recording head, the relationships between the intensity of the magnetic field at the ABS and the distance (the distance along −Z-axis direction) from the end surface of the main pole 3400 when the pole height $D_H$ of the main pole is used as a parameter were simulated. This simulation was performed under the conditions with no magnetic disk. FIG. 11 indicates the result of the simulation, wherein the lateral axis represents the distance from the surface plasmon generator-opposed surface of the main pole 3400 (nm), and the longitudinal axis represents the intensity of the magnetic field (Oe). As will be noted from the figure, although the similar characteristics is obtained when the pole height $D_H$ is 100 nm, 150 nm and 200 nm, the magnetic field intensity at a location with a distance of 80 nm or less from the main pole greatly lowers when the pole height $D_H$ is 50 nm. Therefore, it is desired that the pole height $D_H$ is larger than 50 nm, that is 50 nm$\leq D_H$.

As described in detail, according to the present invention, the surface plasmon generator-opposed surface (near-field light generator-opposed surface) 3400f of the main pole 3400 backs away from the surface plasmon generator 36 at a section far from the end surface 3400e in comparison with at a section near the end surface 3400e so that a distance between the surface plasmon generator-opposed surface (near-field light generator-opposed surface) 3400f and the surface plasmon generator 36 at the section far from the end surface 3400e is larger than that at the section near the end surface 3400e. In other words, the convex protrusion 3400p is formed at a location with a small distance from the end surface 3400e. Thus, it is possible to obtain both the sufficient heating ability and sufficient write magnetic field, which are necessary for the perpendicular recording to the magnetic medium. Particularly, since the length along X-axis or pole height $D_H$ of the convex protrusion 3400p is as 50 nm<$D_H \leq$500 nm, and the space size $D_G$ between the propagation edge 360 of the surface plasmon generator 36 and the surface plasmon generator-opposed surface 3400f of the main pole 3400 at the convex protrusion 3400p is as 15 nm<$D_G \leq$80 nm, more appropriate heating ability and write magnetic field can be expected.

In the aforementioned embodiment, the Kretschmann configuration is used for the configuration of the surface plasmon excitation. However, in modifications, the Otto configuration may be utilized.

All the foregoing embodiments are by way of example of the present invention only and not intended to be limiting, and many widely different alternations and modifications of the present invention may be constructed without departing from the spirit and scope of the present invention. Especially, the near-field light generating optical system according to the present invention that includes a near-field light optical device utilizing a surface plasmon mode can be applied to optical devices with greatly minute optical paths such as ultra-high-speed light modulation devices. Accordingly, the present invention is limited only as defined in the following claims and equivalents thereto.

The invention claimed is:

1. A thermally-assisted magnetic recording head comprising:
   a waveguide through which a light for exciting surface plasmon propagates;
   a near-field optical device configured to be coupled with the light in a surface plasmon mode and to emit near-field light from a near-field-light-generating end surface that forms a portion of an opposed-to-medium surface; and
   a magnetic pole for generating write field from its end on the opposed-to-medium surface side,
   said near-field optical device including a contact-to-waveguide surface having a contact to said waveguide, and a propagation edge provided on a side opposite to the contact-to-waveguide surface, extending to the near-field-light-generating end surface, and configured to propagate thereon the surface plasmon excited by the light, a gap between a near-field optical device-opposed surface of said magnetic pole and said propagation edge of said near-field optical device being larger at a section far from the end on the opposed-to-medium surface side than that at a section near said end on the opposed-to-medium surface side.

2. The thermally-assisted magnetic recording head as claimed in claim 1, wherein the gap $D_G$ between said near-field optical device-opposed surface of said magnetic pole and said propagation edge of said near-field optical device is constant when a distance from said end on the opposed-to-medium surface side of said magnetic pole is equal to or less than a predetermined value $D_H$, and wherein the gap $D_G$ increases when the distance is larger than said predetermined value $D_H$.

3. The thermally-assisted magnetic recording head as claimed in claim 2, wherein said predetermined value $D_H$ is equal to or less than 500 nm.

4. The thermally-assisted magnetic recording head as claimed in claim 3, wherein said predetermined value $D_H$ is larger less than 50 nm.

5. The thermally-assisted magnetic recording head as claimed in claim 1, wherein the gap $D_G$ between said near-field optical device-opposed surface of said magnetic pole and said propagation edge of said near-field optical device is equal to or larger than 15 nm.

6. The thermally-assisted magnetic recording head as claimed in claim 5, wherein the gap $D_G$ between said near-field optical device-opposed surface of said magnetic pole and said propagation edge of said near-field optical device is equal to or smaller than 80 nm.

7. The thermally-assisted magnetic recording head as claimed in claim 1, wherein said near-field optical device has substantially a shape of triangle pole, wherein said contact-to-waveguide surface is one of side surfaces of said triangle pole, and wherein said propagation edge is a side edge that is opposed to the one of side surfaces.

8. The thermally-assisted magnetic recording head as claimed in claim 1, wherein said near-field optical device is formed of an alloy that contains at least one element selected from a group of gold, silver, aluminum, palladium, copper, ruthenium, rhodium and iridium.

9. The thermally-assisted magnetic recording head as claimed in claim 1, wherein said near-field optical device is covered with a material that has a refractive index lower than a refractive index of a constituent material of the waveguide, a portion of the material that covers the near-field optical device lying between said magnetic pole and said propagation edge.

10. The thermally-assisted magnetic recording head as claimed in claim 9, wherein said waveguide, said near-field optical device and a portion of a material that covers said near-field optical device are arranged in a Kretschmann configuration.

11. The thermally-assisted magnetic recording head as claimed in claim 10, wherein the material is a constituent material of an overcoat layer formed so as to cover said waveguide, said near-field optical device and said magnetic pole.

12. The thermally-assisted magnetic recording head as claimed in claim 1, wherein a magnetic shield is provided on a side opposite to said magnetic pole when viewed from said near-field optical device.

13. A head gimbal assembly including a thermally-assisted magnetic recording head and a suspension supporting said thermally-assisted magnetic recording head,
said thermally-assisted magnetic recording head comprising:
a waveguide through which a light for exciting surface plasmon propagates;
a near-field optical device configured to be coupled with the light in a surface plasmon mode and to emit near-field light from a near-field-light-generating end surface that forms a portion of an opposed-to-medium surface; and
a magnetic pole for generating write field from its end on the opposed-to-medium surface side,
said near-field optical device including a contact-to-waveguide surface having a contact to said waveguide, and a propagation edge provided on a side opposite to the contact-to-waveguide surface, extending to the near-field-light-generating end surface, and configured to propagate there on the surface plasmon excited by the light,
a gap between a near-field optical device-opposed surface of said magnetic pole and said propagation edge of said near-field optical device being larger at a section far from the end on the opposed-to-medium surface side than that at a section near said end on the opposed-to-medium surface side.

14. A magnetic recording apparatus including at least one head gimbal assembly provided with a thermally-assisted magnetic recording head and a suspension supporting the thermally-assisted magnetic recording head, at least one magnetic recording medium, and a recording circuit configured to control write operations that said thermally-assisted magnetic recording head performs to the at least one magnetic recording medium,
said thermally-assisted magnetic recording head comprising:
a waveguide through which a light for exciting surface plasmon propagates;
a near-field optical device configured to be coupled with the light in a surface plasmon mode and to emit near-field light from a near-field-light-generating end surface that forms a portion of an opposed-to-medium surface; and
a magnetic pole for generating write field from its end on the opposed-to-medium surface side,
said near-field optical device including a contact-to-waveguide surface having a contact to said waveguide, and a propagation edge provided on a side opposite to the contact-to-waveguide surface, extending to the near-field-light-generating end surface, and configured to propagate there on the surface plasmon excited by the light,
a gap between a near-field optical device-opposed surface of said magnetic pole and said propagation edge of said near-field optical device being larger at a section far from the end on the opposed-to-medium surface side than that at a section near said end on the opposed-to-medium surface side,
said recording circuit further comprising a light-emission control circuit configured to control operations of a light source that generates the light for exciting surface plasmon.

* * * * *